US008656510B1

(12) United States Patent
Sivasankar et al.

(10) Patent No.: US 8,656,510 B1
(45) Date of Patent: Feb. 18, 2014

(54) SYSTEM, APPARATUS, AND METHOD FOR SIMULTANEOUS SINGLE MOLECULE ATOMIC FORCE MICROSCOPY AND FLUORESCENCE MEASUREMENTS

(75) Inventors: Sanjeevi Sivasankar, Ames, IA (US); Hui Li, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 13/569,927

(22) Filed: Aug. 8, 2012

Related U.S. Application Data

(60) Provisional application No. 61/574,735, filed on Aug. 8, 2011.

(51) Int. Cl.
*G01Q 30/02* (2010.01)
(52) U.S. Cl.
USPC .......................................................... 850/9
(58) Field of Classification Search
USPC .......................................................... 850/9
See application file for complete search history.

(56) References Cited

U.S. PATENT DOCUMENTS

| 4,724,318 | A | | 2/1988 | Bennig |
| 5,581,082 | A | * | 12/1996 | Hansma et al. .................. 850/3 |
| 5,874,668 | A | | 2/1999 | Xu et al. |
| 6,127,682 | A | | 10/2000 | Nakamoto |
| 6,806,953 | B2 | | 10/2004 | Engelhardt et al. |
| 6,844,150 | B2 | | 1/2005 | Weiss et al. |
| 2007/0152144 | A1 | * | 7/2007 | Quake et al. .................. 250/234 |
| 2008/0192262 | A1 | * | 8/2008 | Enderlein .................... 356/610 |

OTHER PUBLICATIONS

Agilent Technologies, "Agilent 5100 AFM/SPM Microscope Data Sheet", 2008, 4 pages.
Andor Technology, "iXon EMCCD Camera Series", http://www.andor.com/scientific-cameras/ixon-emccd-camera-series [retrieved from the Internet on Aug. 8, 2012], 2 pages.
"Atomic force microscopy" from Wikipedia, http://en.wikipedia.org/wiki/Atomic_force_microscopy, [retrieved from the Internet on May 18, 2011], 9 pages.
"Avalance photodiode", from Wikipedia, http://en.wikipedia.org/wiki/Avalanche_photodiode, [retrieved from the Internet on Aug. 5, 2011], 1 page.
Choi, Charina L. et al., "Spatially Indirect Emission in a Luminescent Nanocrystal Molecule", NANO Letters 2011, 11, pp. 2358-2362.
"Forster resonance energy transfer", from Wikipedia, http://en.wikipedia.org/wiki/F%C3%B6rster_resonance_energy_transfer, [retrieved from the Internet on May 18, 2011], 8 pages.
"LabVIEW", from Wikipedia, http://en.wikipedia.org/wiki/LabVIEW, [retrieved from the Internet on Aug. 5, 2011], 1 page.
Leckband, Deborah et al., "Mechanism of homophilic cadherin adhesion", Current Opinion in Cell Biology 2000, 12:587-592.

(Continued)

*Primary Examiner* — Jack Berman
*Assistant Examiner* — Eliza Osenbaugh-Stewart
(74) *Attorney, Agent, or Firm* — McKee, Voorhees & Sease, P.L.C.

(57) ABSTRACT

An apparatus, system, and method of integrating atomic force microscopy (AFM) and fluorescence microscopy (FM). One particular application is to simultaneous single molecular fluorescence with AFM force spectroscopy. Included is a methodology to align the AFM tip and a molecule or other nanoscale object with high accuracy.

10 Claims, 17 Drawing Sheets
(7 of 17 Drawing Sheet(s) Filed in Color)

(56) References Cited

OTHER PUBLICATIONS

Li, Hui et al., "Simultaneous AFM Force Spectroscopy and FRET Measurements on Single Biological Molecules", Abstract 828-Pos Board B628, Mar. 6, 2011, p. 152a.

Li, Hui et al., "Abstract: S1.00140: Simultaneous AFM force spectroscopy and FRET measurements on single biological molecules", Bulletin of the American Physical Society, APS March Meeting 2011, vol. 56, No. 1, http://meetings.aps.org/Meeting/MAR11/Event/141569, [retrieved from the Internet on May 18, 2011], 2 pages.

Li, Hui et al., "Fluorescence Axial Localization with Nanometer Accuracy and Precision" NANO Letters, 2012, 12:3731-3735.

Li, Hui et al., "Fluorescence Axial Localization with Nanometer Accuracy and Precision" Supporting Information, pp. 1-15, 2012.

Li, Hui et al., "Simultaneous AFM force spectroscopy and FRET measurements on single biological molecules", APS March Meeting, 2011, Abstract,The Smithsonian/NASA Astrophysics Data System, http://adsabs.harvard.edu/abs/2011APS..MAR.S1140L, [retrieved from the Internet on Aug. 2, 2012], 1 page.

MPD Micro Photon Devices, http://www.microphotondevices.com/products_pdm.asp, [retrieved from the Internet on Aug. 9, 2012], 1 page.

MPD Micro Photon Devices, PDM series, www.micro-photon-devices.com, brochure, v3.8, 2 pages.

Pi, "Piezo Nano Positioning", http://physikinstrumente.com/en/products/prdetail.php?sortnr=201535, [retrieved from the Internet on Aug. 8, 2012], 2 pages.

Princeton Instruments, Acton Standard Monochromators & Spectrographs, http://princetoninstruments.com/products/spec/actonseries/, [retrieved from the Internet on Aug. 8, 2012], 3 pages.

Sivasankar, Sanjeevi et al., "Nanoparticle-Mediated Nonfluorescent Bonding of Microspheres to Atomic Force Microscope Cantilevers and Imaging Fluorescence from Bonded Cantilevers with Single Molecule Sensitivity", NANO Letters, 2009, vol. 9, No. 5, pp. 2120-2124.

Yildiz, Ahmet et al., "Myosin V Walks Hand-Over-Hand: Single Fluorophore Imaging with 1.5-nm Localization", Science, vol. 300, Jun. 27, 2003, pp. 2061-2065.

* cited by examiner

GRATING/CCD
CAMERA, OPTICS AND AVALANCHE
PHOTO DIODE SUB-SYSTEM

PLURAL FM LASER SUB-SYSTEM

SYSTEM, APPARATUS, AND METHOD FOR SIMULTANEOUS SINGLE MOLECULE ATOMIC FORCE MICROSCOPY AND FLUORESCENCE MEASUREMENTS

CROSS-REFERENCE TO RELATED APPLICATION

This application claims the benefit of U.S. provisional application Ser. No. 61/574,735, filed Aug. 8, 2011, which is incorporated by reference herein in its entirety.

1 BACKGROUND OF THE INVENTION

1.1 Field of the Invention

The present invention relates to microscopy and, in particular, to apparatus, methods, and systems for simultaneous atomic force microscopy and fluorescence measurements (sometimes referred to as "AFM-FM"), including but not limited to single molecules or other nano-scale structures.

We describe a combined single molecule AFM-confocal fluorescence microscope which is capable of simultaneously measuring fluorescence time traces, spectra and forces of single molecules (sometimes referred to as "smAFM-FM").

1.2 Related Art

Atomic Force Microscopy (AFM) is a well-known type of microscopy. See, for example, U.S. Pat. No. 4,724,318 to inventor Binnig, incorporated by reference herein, for discussion of general principles of AFM. The AFM cantilever typically has a probe end on the order of nanometers radius of curvature. AFM can be used for mapping topography of very small surfaces or objects; a type of "imaging" of the surface. But also it can be used in a manner some call force spectroscopy—direct measurement of tip-sample interaction forces. Measurements have been used, for example, to measure nanoscale contacts, atomic bonding, Van der Waals forces, Casimir forces, dissolution forces in liquid and single molecule stretching and rupture forces. Thus, AFM can be used to image and manipulate molecules or nano-scale particles or structures on a variety of surfaces. This includes a three-dimensional surface profile.

The manner in which AFM tip scanning can be accomplished is either with an xyz piezoelectric scanner on which the tip can be mounted or an xyz piezoelectric scanner on which can be placed the sample to be interrogated. Very small movement of tip versus sample is actuated by control of the piezoelectric material. See, for example, U.S. Pat. No. 6,127,682 to inventor Nakamota, incorporated by reference herein, for discussion of the principles and apparatus for scanning techniques useful for AFM.

AFM is not without limitations. There can be limitations on depth of field but also total area of image. Scanning speed is also a limitation relative to other micro- and nano-imaging methods. Additional limitations are well known in the art. See, for example, U.S. Pat. No. 5,874,668 to inventors Xu and Arnsdorf, which is incorporated by reference herein, for a discussion of issues with AFM, including for biological samples.

Therefore, there is room for improvement in this technological field. For example, it could be beneficial to gather or sense other information about a sample when using AFM. There remain various needs in the technical art for ways to investigate and gain understanding for very small samples and objects.

There have been suggestions of combining AFM with other information gathering techniques or other microscopy techniques. One example is Forster Resonance Energy Transfer (FRET). A discussion of FRET and other fluorescence-based microscopy techniques is set forth in U.S. Pat. No. 6,844,150 to inventors Weiss, et al., incorporated by reference herein. U.S. Pat. No. 6,806,953 to inventors Engelhardt and Hoffmann, incorporated by reference herein, provide an example of a fluorescence-based microscope and its operation.

An example of such combined techniques is described in Sivasankar, S. and Chu, S., Nanoparticle-Mediated Nonfluorescent Bonding of Microspheres to Atomic Force Microscope Cantilevers and Imaging Fluorescence from Bonded Cantilevers with Single Molecule Sensitivity, *NANO LETT.* 2009, Vol. 9, No. 5, 2120-2124, incorporated by reference herein. It describes an example of an AFM subsystem and a fluorescence microscopy subsystem. While this approach has certain benefits, there remains room for improvement.

Other attempts to combine AFM and fluorescence microscopy (FM) tend to be crude combinations which are unwieldy and experimental at best. They normally require a highly skilled person (Ph. D. or grad-student level) to even attempt to operate them. They are not integrated in the sense of control, measurements, or manipulation ability.

A need has therefore been identified in the technological art for improvements in this area. For example, the article of *NANO LETT,* 2009, Vol. 9, No. 5, 2120-2124 has discussed some of the technological hurdles. One example is the low probability of interaction between a sample on the substrate and the AFM tip. Id. pg. 2120, ¶2. The approach there is to add a larger colloidal probe to the normally sharp AFM tip to increase the area of contact between the tip and substrate. However, this has been found to have limitations and issues.

2 SUMMARY OF THE INVENTION

The present invention relates to improvements in microscopy involving ability for simultaneous single molecule AFM and fluorescence measurements.

Integrated AFM and FM

One aspect of the invention comprises a method to perform AFM functions on a sample while simultaneously capturing fluorescence information related to the sample. In one embodiment, a laser or other light source like a Super Luminescent Diode (sometimes hereinafter referred to as "AFM laser") can be reflected off the AFM cantilever and optically monitored by, for example, quadrant photodiodes, to make an AFM record based on cantilever deflection. A different laser (sometimes hereinafter referred to as "FM laser") can excite fluorescence in the sample along a different optical path. This laser can be used to excite fluorescence, capture and record an image of or information about the sample. That image or information can be either spectral and/or dynamic depending on selected filters, detectors and fluorophores. Different lasers can be used for different FM measurements.

In another aspect of the invention, an integrated AFM-FM apparatus can be housed with a relatively small bench-top footprint with integration of controls, measurements, and manipulation. This can include a computer and software that would present a graphic user interface to facilitate such integration of operation. The system would be integrated both physically and operationally.

In another aspect of the invention, an apparatus and method for AFM-FM, including smAFM-FM, would utilize a standardized or basic set up but would facilitate a plurality of modules that can be interchanged into the base system to allow a variety of different specific AFM-FM applications. For example, a first module could basically be plugged in to the base unit for AFM-FRET intensity and lifetime measurements. The module would either communicate with a main controller or a computer to instruct that mode of operation, as well as be pre-packaged and calibrated to perform that type of AFM and simultaneous fluorescent measurement mode. If AFM-photon anti-bunching experiments are desired, a different module can be essentially plugged in and ready to go. The same can be said for other modes.

An example of an integrated AFM-FM system comprises an xyz piezoelectric scanner, such as are conventional with AFM instruments, as well as one or more piezo stages for the FM. An AFM laser is reflected off the xyz scanner probe tip onto a quadrant photodetector, as is also conventional. However, appropriate optics facilitate one or more FM lasers to use a single optical path for selectively capturing fluorescence from the sample. The FM laser(s) can be used to excite the sample. By integrating the ability to not only record AFM probe actions, but also simultaneously capture and record fluorescence at the sample, contemporaneous information and/or actions relative the sample can be collected and mined for beneficial information. For example, not only can topography be mapped, contemporaneous information about structure, dynamics, and even optical properties of the sample can be collected.

AFM Tip and Sample Alignment

Another aspect of the invention is a method, different than in *NANO LETT*, 2009, Vol. 9, No. 5, 2120-2124, to align an AFM tip with a sample. One example of the method aligns the tip with a sample comprising fluorescent molecules. The method first determines, with nanometer precision, the location of the center of the AFM tip. The AFM tip is imaged by precisely moving it through the fixed position FM laser beam and measuring the light reflected off the AFM tip at each location. The center of the tip is determined by finding the centroid of the optical intensity of the reflected light in the image. The method then determines the position(s) of target fluorescent molecules(s) in a sample by similarly scanning the sample through the FM laser beam. The molecule(s) is/are similarly imaged by measuring fluorescent emissions from the molecules for each scan position. By fitting the image to a Gaussian function, the intensity peaks are calculated. The peaks are indicative of molecule position to nanoscale precision. The tip and molecule are now located at the center of the FM laser beam. Thus, fine alignment between AFM tip distal end and target molecule is accomplished. This alignment method can be beneficial for a wide variety of AFM-FM applications. With the positions of the tip and molecule estimated, by appropriate nanoscale control of the microscope stage(s) the tip can be aligned with the molecule for a variety of functions. One example is to press or stretch the molecule while recording corresponding changes in fluorescence. Thus, this aspect of the invention can provide an efficient, accurate, and practical way to practice smAFM-FM, or similar investigation of nanoscale structures or objects.

Force Spectroscopy and FM

Another aspect of the invention comprises a method, apparatus, and system to utilize the force spectroscopy aspect of AFM on or near the sample while simultaneously obtaining fluorescence information from the sample. The instrument and method can apply forces on individual molecules or nanoscale objects and simultaneously monitor their structure, dynamics, and optical properties. By allowing simultaneous AFM manipulation of the probing tip relative to the sample with concurrent obtaining of fluorescence data, the instrument can be effectively used for a variety of applications. A few examples include, but are not limited to, single molecule measurements regarding (a) AFM-FRET intensity and lifetime measurements, (b) AFM-fluorescence intensity and spectral measurements, (c) AFM-photon antibunching experiments, and (d) AFM-Raman measurements. Another example would be to test a sample for how its optical properties might change under forces, and utilize fluorescence information to inform design of such things as optical MEMS (microelectromechanical systems) devices (e.g., pressure sensors, disc drive heads, biosensors, optical switches, optical force sensors).

Examples of Applications

As can be appreciated, potential applications include, but are not limited to, life science research (structure and dynamics of biological molecules such as DNA and proteins; interaction of biomolecules with receptors and toxins); drug discovery (direct observation of targeted drug delivery and interactions in vitro in live cells and tissues); nanoscience and nanotechnology (characterization of optical properties of nanoscale materials like semiconductor nanocrystals, nanotubes, and nanowires; measuring force dependent optical properties); material science (characterization of materials with force dependent optical properties, developing more efficient organic semi-conductor polymers); environmental research (detection of toxins and pollutants at ultimate (single molecule) resolution; identifying chemical properties at single molecule level using its spectral signature); optical MEMS (design of optical MEMS devices that rely on external stress to change optical properties).

A goal of the present invention is to integrate AFM with simultaneous FM measurement in a practical, commercially and economically, manner for accurate, efficient, yet highly flexible application.

3 BRIEF DESCRIPTION OF THE DRAWINGS

Figure 2A:
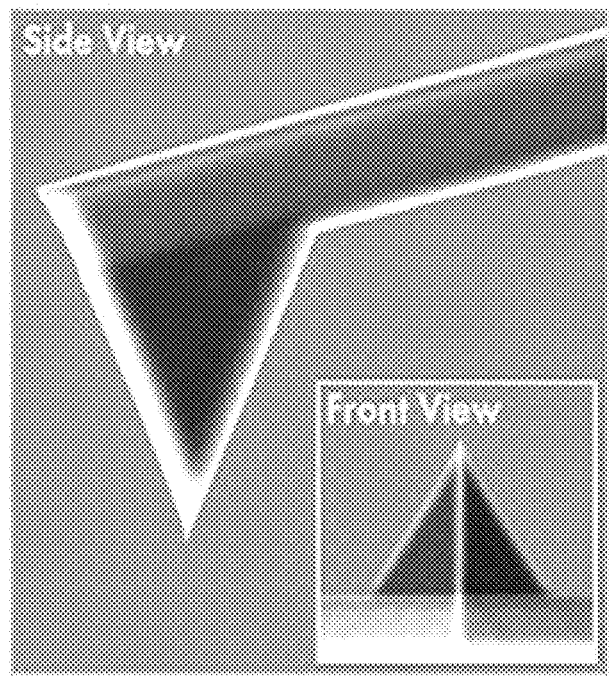
Figure 2B:
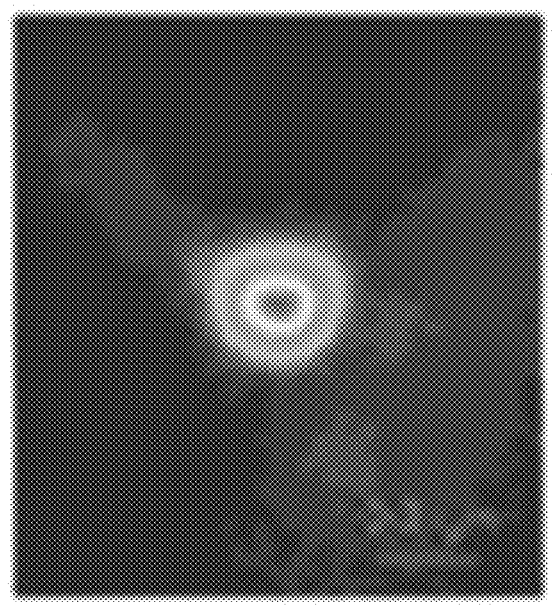
Figure 2C:
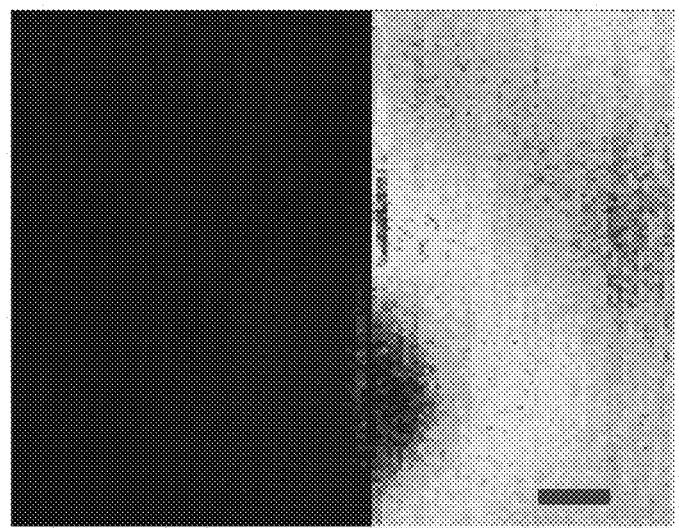
Figure 2D:
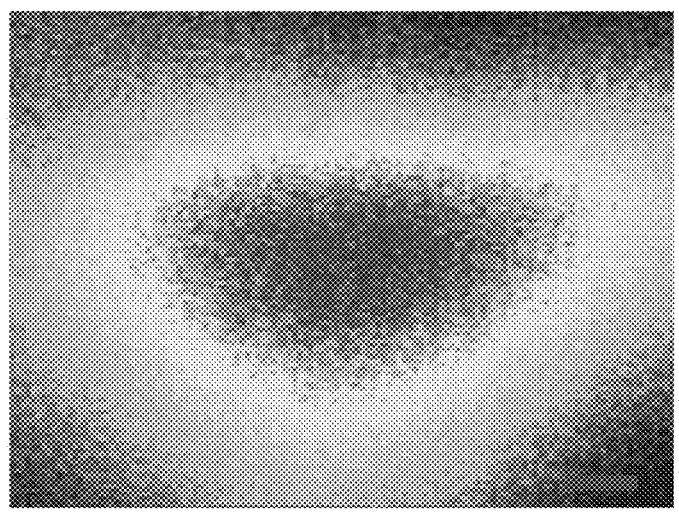
Figure 2E:
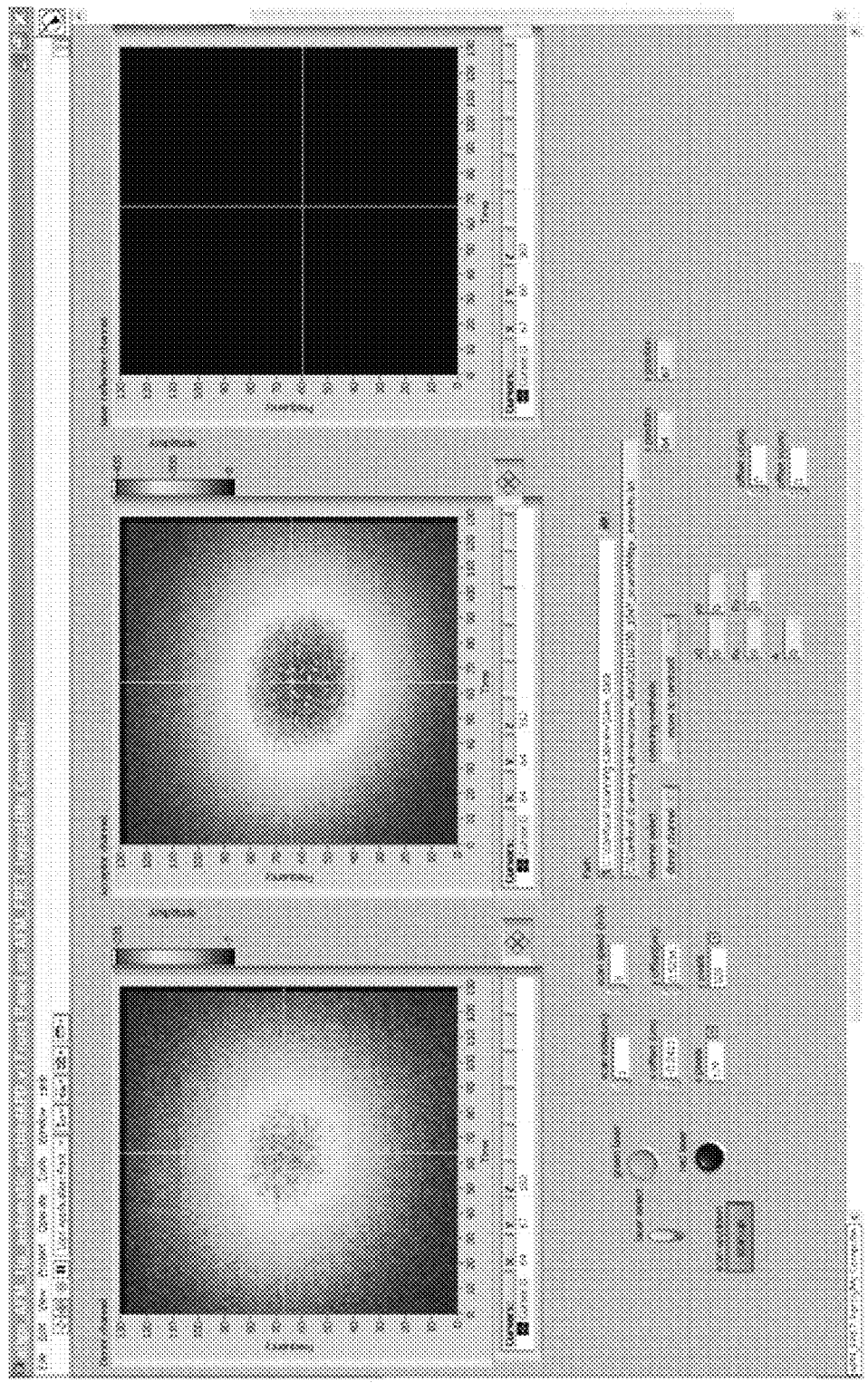
Figure 2F:
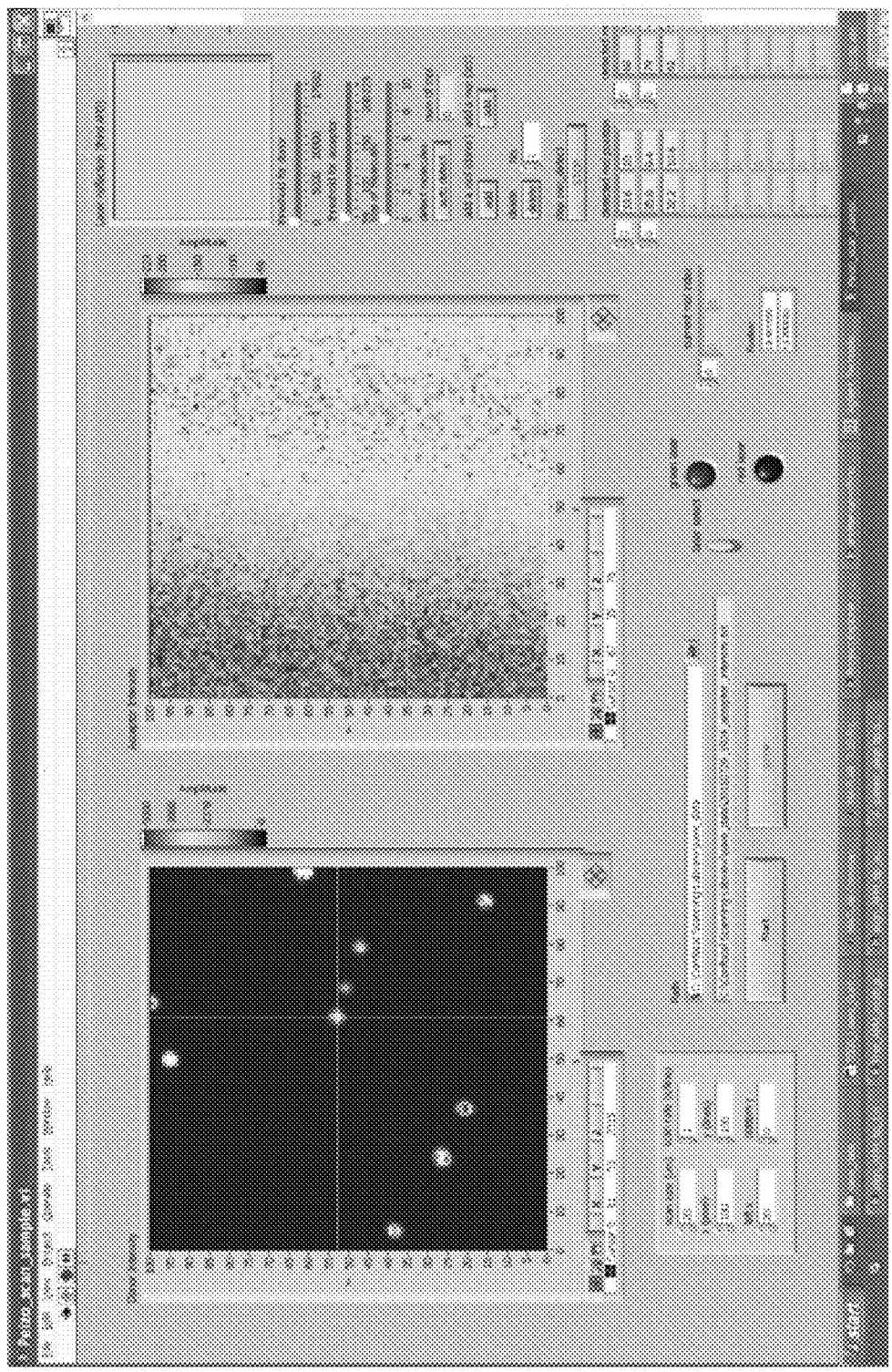

FIGS. 2A-F and H are illustrations to help describe an alignment method for the AFM tip and sample molecule(s) according to an aspect of the invention. FIG. 2A is a scanning electron microscope image of a typical AFM tip. FIG. 2B is a scaled image of recorded Raleigh scattered light as the AFM tip is scanned over the FM laser beam. FIGS. 2C and 2D are images of recorded fluorescence from a fluorescence bead located in the FM laser and light scattered by the AFM tip, respectively. FIGS. 2E-F are computer screen displays illustrating steps in the method of aligning AFM tip and a sample molecule. FIG. 2H is a flow chart and associated images (color) further illustrating the tip positioning method.

Figure 2G:
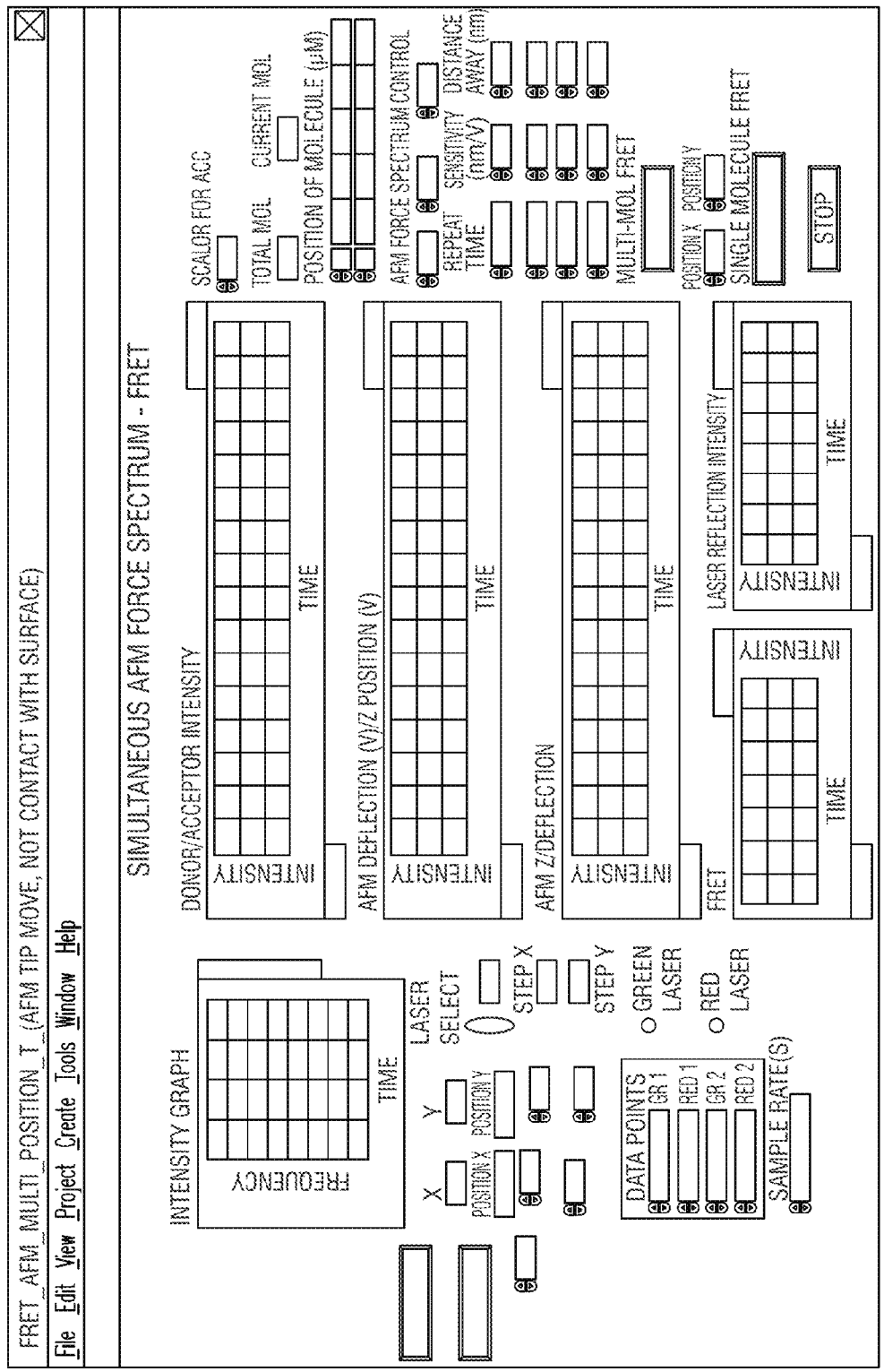
Figure 2H:
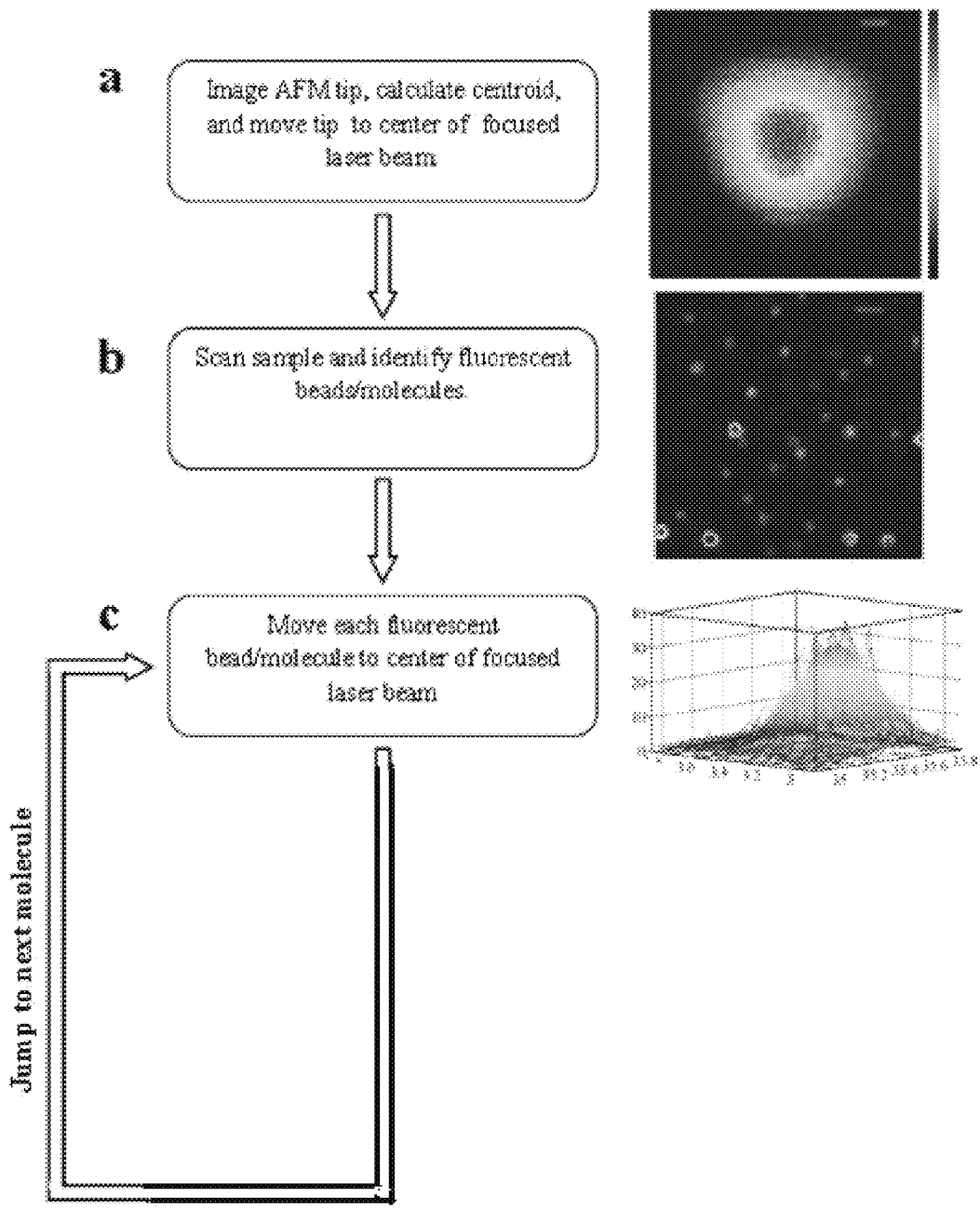

FIG. 2G is a computer screen display illustrating steps in the method of aligning AFM tip and a sample molecule.

Figure 3A:
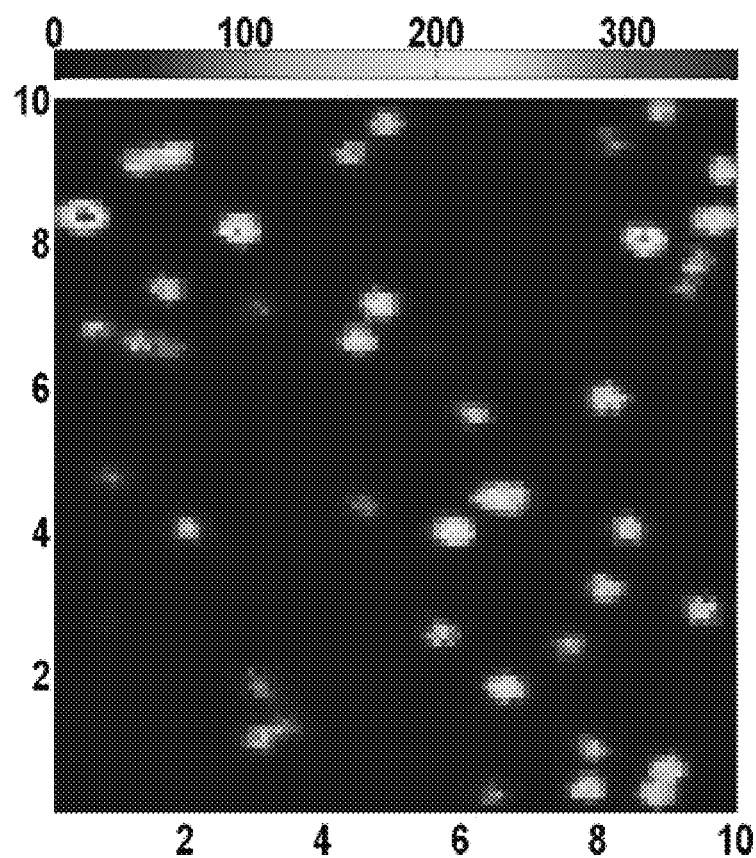

FIGS. 3A (color) and 3B-3D are an image and graphs related to application of AFM-FM methods of the invention to tip-induced fluorescence enhancement and quenching.

Figure 4:
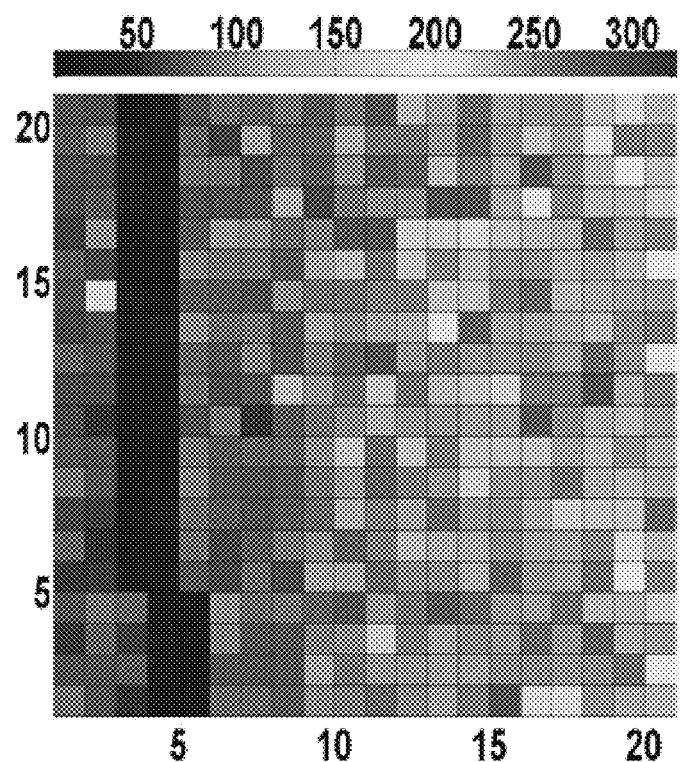

FIG. 4 (color) is an image illustrating application of AFM-FM methods of the invention to single molecule cut and paste techniques.

Figure 5A:
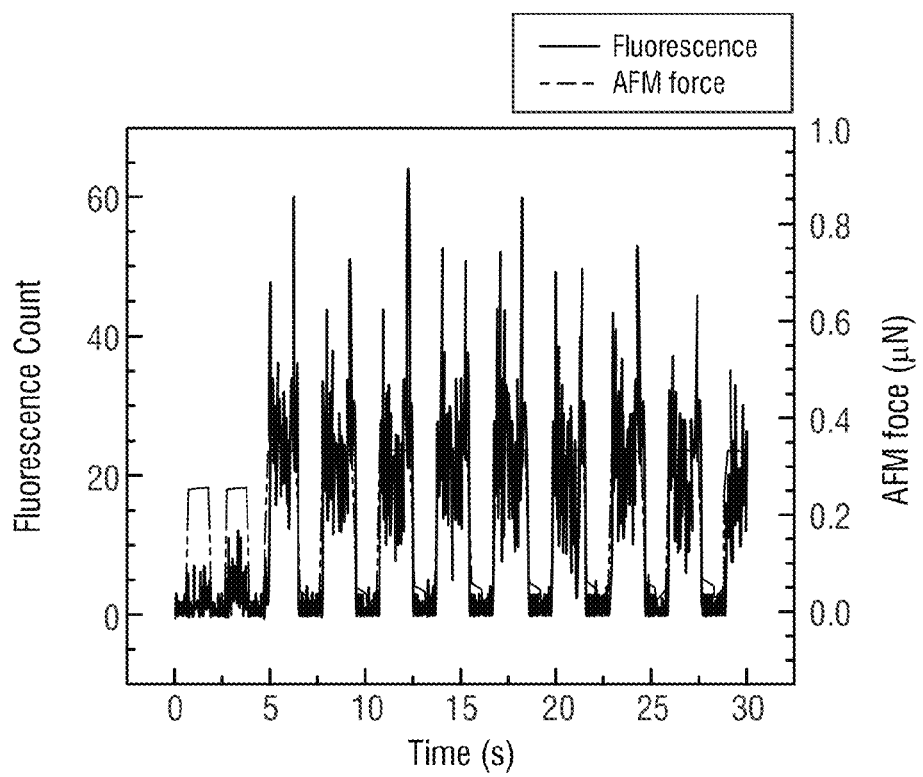
Figure 5B:
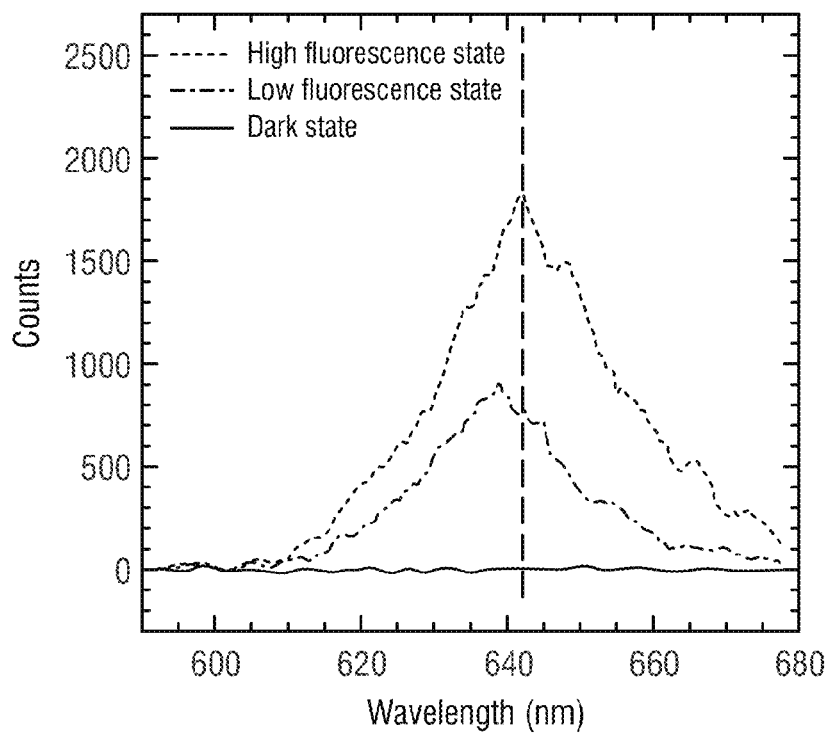

FIGS. 5A and 5B are graphs illustrating application of AFM-FM to force dependent changes on optical properties of a specific nanoscale structure; a CdS/CdSe tetrapod.

4 DETAILED DESCRIPTION OF EXEMPLARY EMBODIMENTS 4.1 Overview

The patent or application file contains at least one drawing executed in color. Copies of this patent or patent application publication with color drawing(s) will be provided by the Office upon request and payment of the necessary fee.

For a better understanding of the invention, several exemplary embodiments which illustrate aspects of the invention will now be described in detail. It is to be understood that these are but several examples of forms the invention can take and are neither inclusive nor exclusive. Variations obvious to those skilled in the art will be included within these examples. But the invention and its aspects can take many other and different forms of embodiments.

4.2 Example of Apparatus

With reference to FIGS. 1A-1F, one exemplary embodiment of an smAFM-FM system, according to the present invention, is illustrated. Particular reference should be taken to FIG. 1C.

At a general level, a system 10 according to this example includes a housing 12 of a relatively small footprint on a standard tabletop or desktop. Housing 12 includes components for AFM as well as for fluorescent measurements. In one example the entire system, except perhaps the computer (processor 42, keyboard 47, display 46, mouse 48 etc.) could be enclosed, or substantially enclosed, in a housing that might occupy no more than approximately 5-30 ft² of bench-top or desk-top area (see FIG. 1A). The system could be made essentially "turn-key".

Figure 1A:
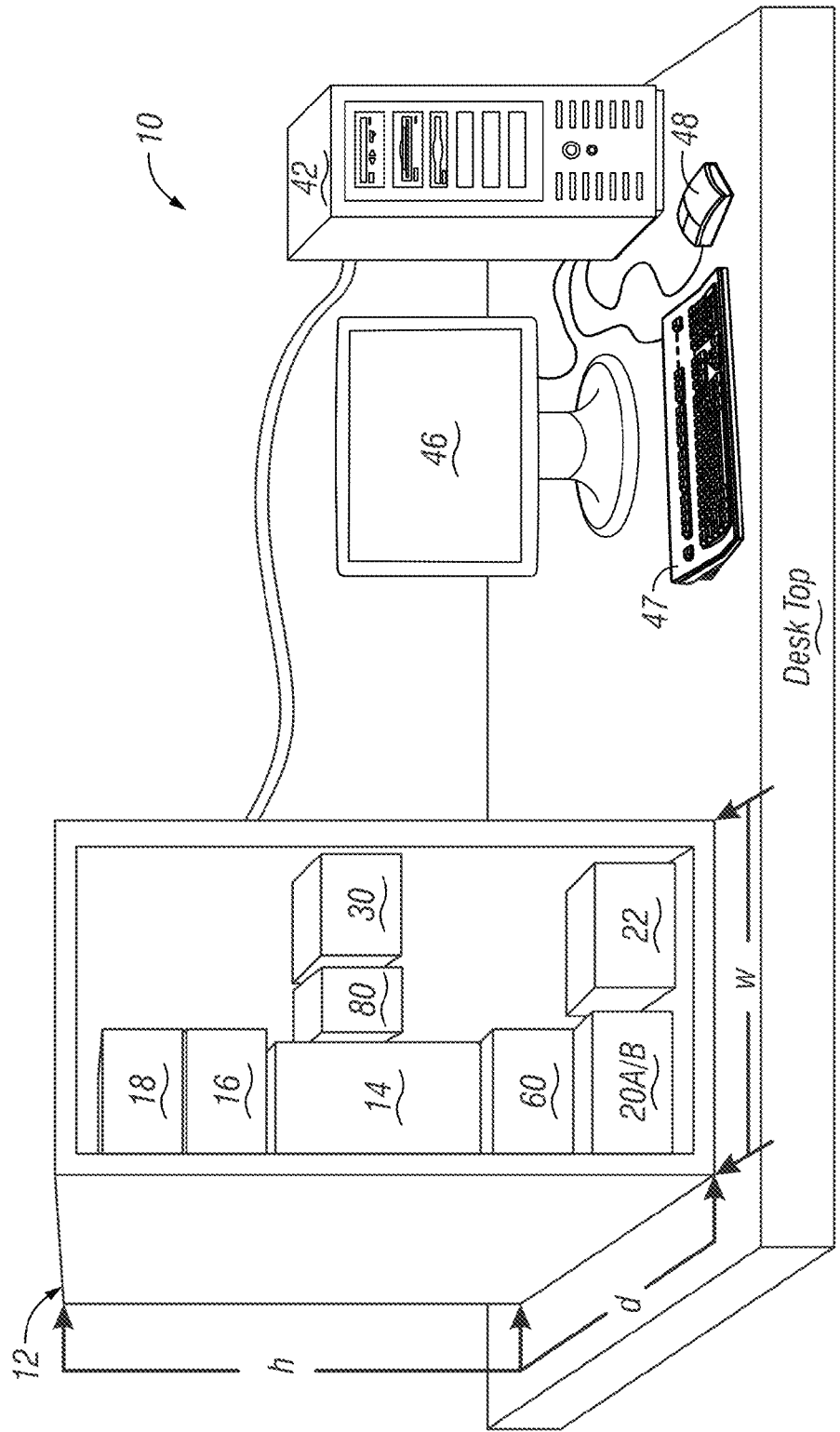
FIG. 1A is a diagrammatic illustration of an AFM-FM system according to one exemplary embodiment of the present invention.
Figure 1B:
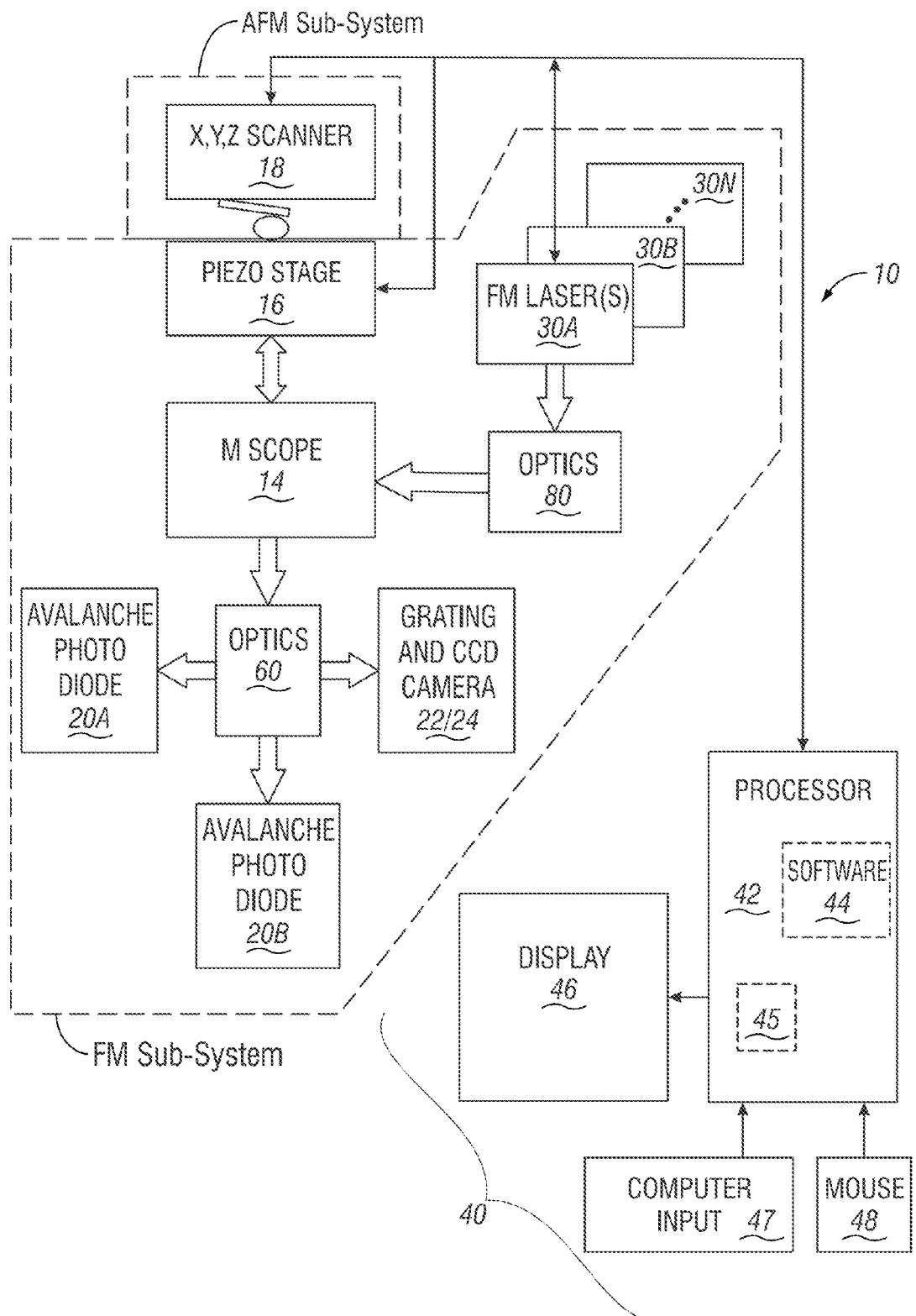
FIG. 1B is a block diagram of major components of the system of FIG. 1A.
Figure 1C:
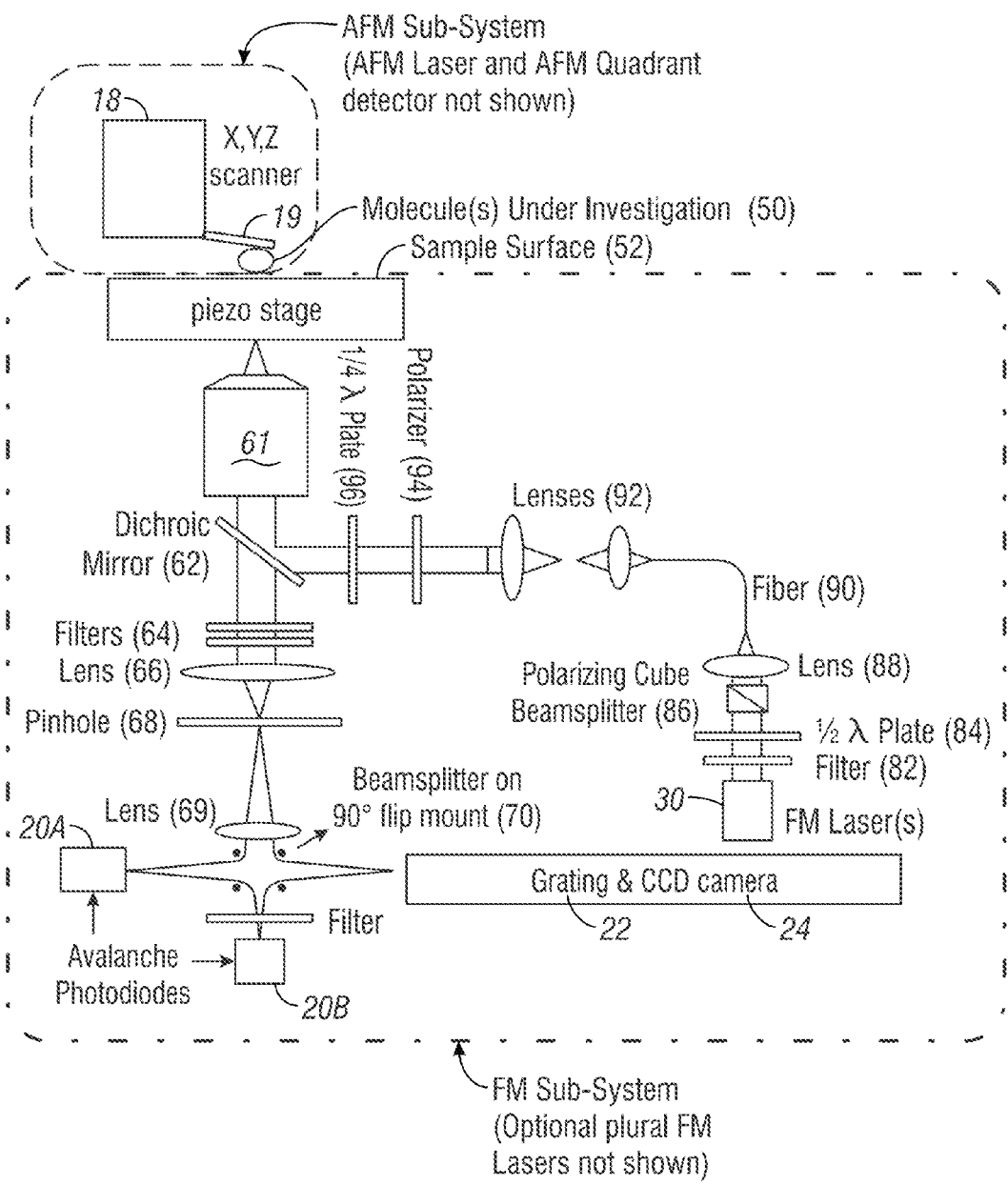
FIG. 1C is a detailed schematic of one embodiment of specific components that could be used to form the system of FIGS. 1A and 1B.

This small foot-print is facilitated by the conceptual design of system 10 in FIG. 1C. Note how the selection, combination and arrangement of components, utilizing the same objective lens 61, allow a compactness and economy of space. Further features allowing this are sharing of the same optical axis by grating/camera 22/24 with the photodiodes 20.

As shown, computer sub-system 40 would be operatively connected to relevant components in housing 12. The system is integrated both physically and operationally. For example, the size of housing 12 would be on the order of a few feet wide, a few feet deep, and a few feet tall (see "w", "d", and "h" in FIG. 1A). It would contain at least most of the microscopy and optical components. This would include confocal microscope 14 with appropriate stage(s) 16, scanner 18, and other conventional components and an AFM sub-system with conventional components including tip 19 (the AFM laser and quadrant photodiodes for the AFM sub-system are not show in FIG. 1C; see, e.g., U.S. Pat. No. 5,874,668, incorporated by reference, for examples of the same). It further includes several other sub-systems.

Figure 1D:
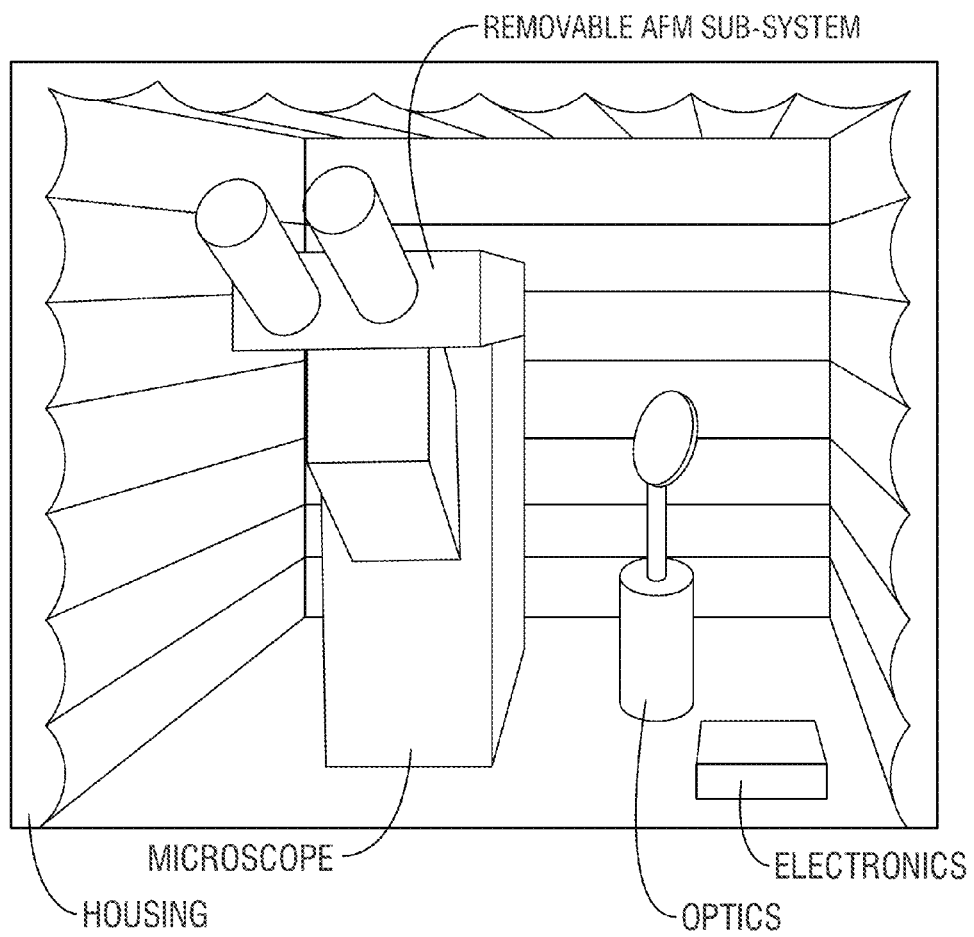
FIG. 1D is a photograph of one example of a confocal microscope set-up with removable AFM sub-system such as could be used with the overall system of FIG. 1A.
Figure 1E:
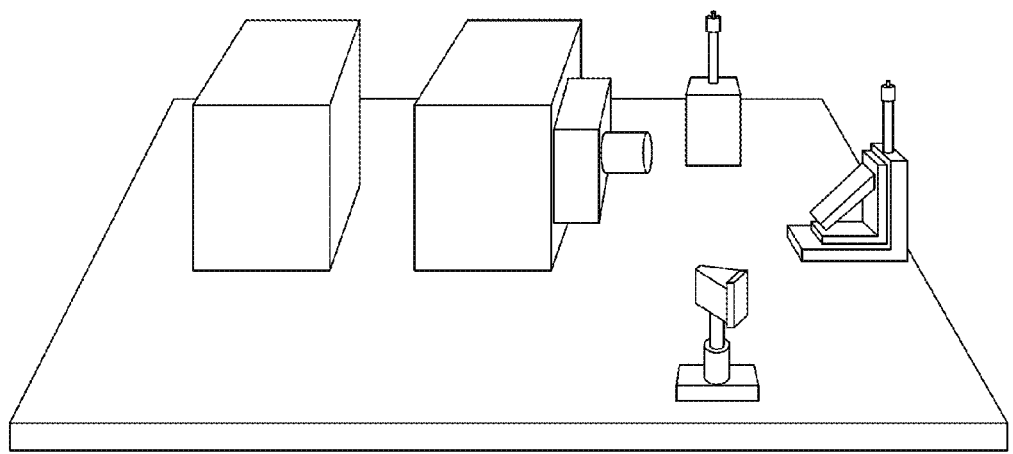
FIG. 1E is a photograph of an avalanche photodiode, grating and CCD camera set-up that can be used with the system of FIGS. 1A-1D.
Figure 1F:
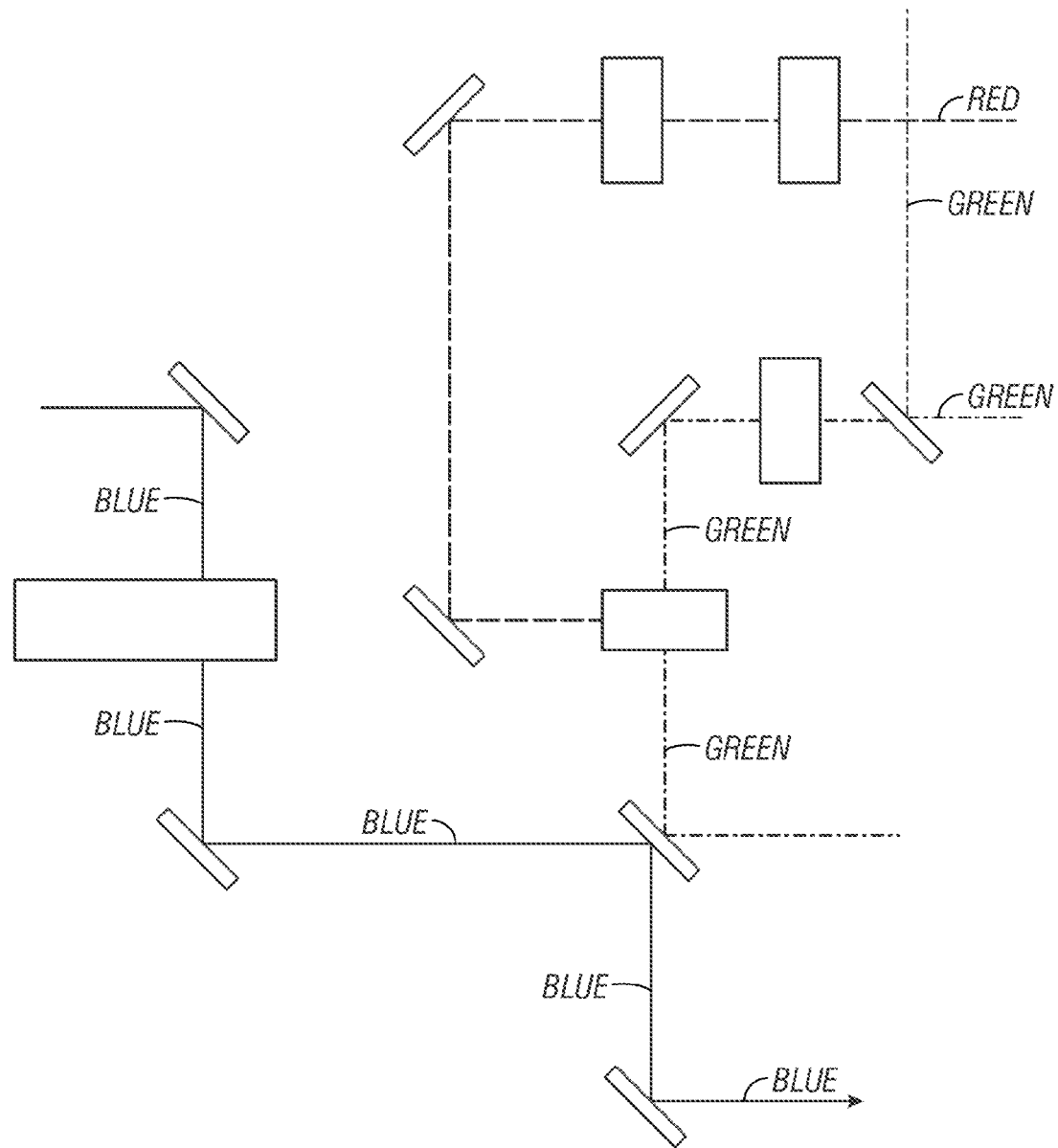
FIG. 1F is a photograph of a plural FM laser set-up that can be used with the system of FIGS. 1A-1D.

One sub-system includes one or more FM lasers 30 (illustrated in FIG. 1B as lasers 30A to 30N, where N is as many as is desired or needed as is practical or possible) and appropriate optics 80 to direct each to a common optical path to microscope objective 61. This allows a selected single laser to be utilized in certain applications, or plural lasers to be either sequentially or simultaneously used. As is diagrammatically illustrated in FIG. 1C, and shown implemented in FIG. 1F, by appropriate optical components, one that one laser 30 can share the same optical path to mirror 62 and through objective 61. This allows selective use of lasers of different characteristics (e.g. different frequency/color, power, width, etc.) for different purposes. It also allows concurrent use of plural laser of the same or different characteristics. FIGS. 1D-F show a bench model to illustrate the ability to economize size and volume of system 10. FIG. 1D shows how an enclosure on the order of the size mentioned above is desk-top size, and could contain at least most of the components of FIG. 1C. A conventional desk-top size computer and peripherals (keyboard, mouse, processor, display) could connect to the components inside the housing. The entire system 10 is thus desk-top scale.

Another sub-system includes optics 60 to deliver light returned through objective 61. The sub-system can provide different options for recording such information (e.g. photodiodes 20 and camera 22).

Computer sub-system 40 could be a conventional desktop PC. Thus, this physical size, as well as the integration of both AFM and FM in housing 12, provides a practical bench-top analytical system.

In this embodiment of such a system 10, the integration of AFM and FM components is best illustrated in FIG. 1C (except the AFM laser and quadrant photodiodes are not shown).

The AFM sub-system is basically conventional (a variation by the inventors is mentioned later). It can be purchased commercially from a number of vendors. It includes conventional components such as xyz scanner 18 with AFM tip or probe 19 operatively positioned relative a sample 16. An example is Model 5100 available commercially from Agilent Technologies, Santa Clara, Calif., USA. U.S. Pat. No. 4,724,318, U.S. Pat. No. 6,127,682, and U.S. Pat. No. 5,874,668, incorporated by reference and discussed earlier, provide details regarding the basic components and methods of AFM, which are well known to those skilled in the art.

A typical AFM laser (not shown) would be optically conditioned and directed to tip 19 along a separate optical path from that of microscope objective 61. Optics, which perform such functions, are available commercially (also not shown). Variations obvious to those skilled in the art are, of course, possible. Typical AFM laser/tip interaction involves essentially tracking of laser beam light reflected from tip 19 which allows a topographical mapping or imaging of a sample 50 on sample surface 52 according to conventional AFM methods. Selectable optical components in that AFM laser beam pathway can be used according to conventional AFM practices.

Importantly, FIG. 1F illustrates that additional lasers 30B to 30N, by using appropriate optics, can be directed to the same optical path to microscope objective 61. This allows for individual or simultaneous presentation of laser beams at sample surface 52. Optical components to allow plural lasers 30A-N to be set up and ready to operate in system 10, and be selectively operated and directed to objective lens 61, are within the skill of those skilled in the art. For example, as indicated at FIG. 1F, a dichroic mirror could be placed in the optical path of the first laser 30 and aligned with the optical path of a second laser 30. If the first laser 30 is to be used, it would be turned on and its output would follow the path indicated diagrammatically in FIG. 1C to dichroic mirror 62 and then to objective 61. If the second laser 30 is to be used, the first laser 30 would be turned off and the second laser 30 turned on. Its output would likewise be directed to dichroic mirror 62 and then objective 61. A third, or more, laser(s) 30 could be made available by similar methods. Alternatively, all lasers could be used simultaneously.

Note particularly optics 60, photodiodes 20 and grating/CCD camera 22/24 of FIG. 1C. Dichroic Mirror 62 allows light returned from sample surface 52 through objective 61 to be captured and directed along a different optical path to beam splitter 70. Beam splitter 70 is configured to allow selective (or simultaneous) collection of such light at avalanche photodiodes 20A and 20B and/or grating/camera 22/24.

Avalanche photodiodes are highly sensitive semiconductor electronic devices. They are photo detectors and used to measure the intensity of fluorescence from a sample. Their sensitivity allows for measurement of even single photons.

An example of commercially available avalanche photodiodes are Model PDM from Micro Photon Devices, Bolzano, ITALY. An example of commercially available grating 22 and CCD camera 24 are Model Acton from Princeton Instruments, Trenton, N.J., USA and Model iXon from Andor Technology, Belfast, Northern Ireland UNITED KINGDOM, respectively.

Other components in FIG. 1C are commercially available and can be selected according to need or desire by those skilled in the art.

Thus, the integration of AFM functions and FM fluorescence measurements is illustrated in FIG. 1C. Beam splitter 70 can direct a portion of light from sample 50 to grating 22 and CCD camera 24. Beam splitter 70 can direct a portion of that light to one or both photodiodes 20A and B. Thus, simultaneous recording of optical information at sample 50 can occur along with the AFM mapping with the AFM sub-system. Other beneficial uses of this sub-system will be described later.

In particular, appropriate optical components and set up illustrated in FIG. 1C allow for AFM and recording of FM information. This can include, for example, using laser 30, or other lasers in the same beam path, to be directed to the sample 50.

Such integration of operational features is an aspect of the present invention. Computer system 40 can include software 44, memory 45, and a graphic user interface presented on display 46 that would also present integrated control and measurement of AFM and FM, as opposed to having each system have its own separate controls. It would also facilitate integrated evaluation of the measured data. This is illustrated by the graphic user interfaces of FIGS. 2E-G, which are but one example of how software according to this exemplary embodiment, helps integrate the operation of the smAFM-FM system 10.

Most of the components for system 10 are available commercially and can be selected and configured into system 10, according to need and desire, by those skilled in the art. To the extent no commercially available, they can be operatively integrated as indicated herein.

Some examples are illustrative. Housing 12 can be made of any number of materials and can include appropriate structure and components to reduce noise into system 10.

Software and the GUI for computer system 40 will allow integrated control of both the AFM aspects and FM aspects of system 10. As can be appreciated by those of skill in the art, the software would be adapted to speak to the AFM sub-system and understand and use the language or protocols of whatever commercial embodiment of AFM is utilized. In particular, in could instruct operation of xyz scanner 18 and other AFM operation including the AFM laser (not shown) and photodiode quadrant detectors (not shown). And, additionally, it would control any piezo stages 16, lasers 30, and other control features. And, furthermore, it would communicate with the AFM sub-system and with photodiodes 20 and camera 24 to allow recordation, manipulation, and evaluation of the data they measure or capture.

As further example, several commercial embodiments of AFM and FM utilize LabView (short for Laboratory Virtual Instrumentation Engineering Workbench), a platform and development environment for a visual programming language from National Instruments. See website at ni.com/labview. Such programming is frequently used for automating the usage of processing and measuring equipment, including but not limited to data acquisition, instrument control, test automation, analysis and signal processing, and industrial automation on a variety of platforms (e.g. Microsoft Windows, UNIX, Linus, Mac OS X). It can be interface with many libraries with a large number of functions (e.g. data acquisition, signal generation, mathematics, statistics, signal conditioning, analysis, etc.), along with numerous graphical interface elements in several LabVIEW package options. The number of advanced mathematic blocks for functions such as integration, filters, and other specialized capabilities usually associated with data capture from hardware sensors is immense. In addition, LabVIEW includes a text-based programming component called MathScript with additional functionality for signal processing, analysis and mathematics. MathScript can be integrated with graphical programming using "script nodes" and uses a syntax that is generally compatible with MATLAB, another well-known programming language (see, e.g. http://www.mathworks.com/products/matlab/). Another known software component is PicoView (see wwww.agilent.com), and imaging and analysis software package that offers 3D rendering capabilities, complete control of all scanning parameters and an integrated script editor and sample scripts. A scripting language can be used to control the several applications in system 10.

As can be appreciated by those skilled in the art, variants of the components in 10 may include piezo stages and programmable controllers. An example for a piezo stage and controller are Model P541 from Physik Instrumente and Model P712 from Physik Instrumente, Auburn, Mass., USA.

For further discussion of system 10 and its possible modes of operation see Examples 1-3 infra.

FIGS. 1A-F, and in particular FIGS. 1A and B, illustrate another aspect of system 10. Specific components of system 10 can be assembled and/or packaged in modular form. This can allow easy interchangeability or substitution to and from housing 12 (FIG. 1A). One example would be interchangeable modules for laser(s) 30. One module could include a single laser and ancillary operational components in its own housing, on its own substrate or board, or otherwise a sub-assembly that could easily added or removed (including connection and orientation to other components). A different module could contain a laser of different characteristics. A still further module could include a plurality of lasers in a form that could be hooked up to system 10 and selectively operated in system 10. Another example would be regarding the detecting components of system 10. Different photodiodes 20 could be in modular form and inserted or removed according to selection by the user. Likewise different grating/camera combinations in modular form could be selectively used. The modules, boards, or sub-assemblies would be of a size that occupies a sub-set of the space inside housing 12. By methods obvious to those skilled in the art, they can be configured or come packaged with the necessary hardware to operationally connect them into system 10. This could include instructions or different accessories or alternatives to accomplish these ends.

4.3 Example Methods of Use

As can be appreciated by those skilled in the art, piezo stage 16 presents a sample surface 52 (see FIG. 1C) upon which a sample 50 under investigation can be placed. As will be indicated later, samples 50 can take many different forms. One example of particular emphasis here is a sample with one or more fluorescence molecules (e.g. molecules that fluoresce when exposed to certain light energy).

The FM laser(s) and optics would be selected according to conventional principles regarding the particular FM functionality desired for an application. As indicated in FIG. 1D, the user would have access to the piezo stage 16 and sample surface 52. The components would be operatively connected, computer system 40 initialized, and the GUI could guide the operator through start up, set up, any calibration procedures, control and manipulation, and recording of information, including simultaneous smAFM-FM.

Additional understanding of operation of system 10 can be derived from specific applications described below.

In general, Single Molecule Fluorescence Resonance Energy Transfer (FRET) is one form of Fluorescence Microscopy (FM), and single molecule force measurements with the Atomic Force Microscope (AFM) are two powerful techniques that have facilitated much progress in the biological sciences. However, each of these techniques suffers from limitations that can be overcome by the use of a combined single molecule AFM-FRET or FM approach. The present system 10 successfully combines single molecule AFM with FRET to apply forces on individual biological molecules and simultaneously monitor their conformational dynamics. The integrated smAFM-FM can be applied to biomedical research, drug discovery, disease diagnosis, ultra-sensitive bio-sensing, nanotechnology, and material science applications, to name a few. The system can be used to apply forces on individual molecules or nanoscale objects and simultaneously monitor the structure, dynamics, and optical properties. It can perform multiple single molecule measurements such as AFM-FRET intensity and lifetime measurements, AFM-fluorescence intensity and spectro measurements, AFM-photon antibunching experiments, and AFM-raman measurements.

Stand-alone AFM has limitations regarding structural changes in molecules as they interact. These can, however, be identified by attaching florescent probes to the molecules and monitoring the structure and dynamics using FRET. Similarly, using smAFM-FM it is possible to apply forces on materials and monitor changes and/or optical properties.

FIG. 1C illustrates a specific example of a feature or aspect of this exemplary embodiment. Tip-scanning AFM was modified with a 970 nm infrared Super Luminescent Diode (SLD). This was mounted on a home built sample scanning confocal microscope 14. A 532 nm frequency doubled ND:YAG laser, a 650 nm diode laser, and a 488 solid state laser (see FIG. 1E) are coupled to single mode optical fiber 90, circularly polarized and telescoped to overfill the back aperture of a 60×1.42 NA (numerical aperture) oil immersion objective 60 (see also the whole optical train of optics 80 in FIG. 1C). Fluorescence is collected by the objective 60, spectrally separated and detected either by two single photon counting avalanche photodiodes (APD) 20A and/or 20B and dispersed by high resolution grating 22 on to a back-thinned EMCCD camera 24.

The AFM sub-system is mounted on the optical microscope 14 with a homebuilt low-noise stage 16.

An intuitive GUI to control optomechanical and electronic components of system 10 in a synchronized fashion and to display data and real time is included. The smAFM-FM microscope can measure force dependent optical properties in a variety of environmental conditions including air and aqueous solutions/biological buffers. The former conditions important for studying nanoscale materials and polymers, while the latter is important for studying biological molecules and living cells.

For simultaneous AFM-FRET measurements, macromolecules labeled with donor fluorophores and their binding partners labeled with exceptor dyes are immobilized on the substrate and AFM-tip respectively, and allowed to interact, the tip and substrate are separated to rupture the molecular complex and measure its bond strength with pN resolution. Simultaneously, donor and exceptor fluorescence are collected by objective 61, spectrally separated and detected by the two APDs to determine FRET in real time. The FRET time traces indicate changes in the structure of the bound molecules with nanometer resolution and the dynamics of them binding with millisecond time resolution.

For simultaneous single molecule AFM-fluorescence spectral measurements, florescent nanoparticles (like semiconductor nanocrystals) or biomolecules labeled with fluorophores are immobilized in a substrate, a calibrated force is exerted on the molecules using the AFM tip while simultaneously the fluorescence is collected by objective 60 and dispersed by high resolution grating 22 on to back-thinned EMCCD camera 24.

As a proof of principle, system 10 was used to measure the force dependence of optical properties of CdS/CdSe tetrapod, a technologically important semiconductor nanocrystal. By referring to FIGS. 5A-5B, we demonstrated that a single tetrapod changes its optical properties when subjected to an external force. As the AFM tip applies a force on the tetrapod by pressing it (FIG. 5A, red trace) tetrapod fluorescence emission intensity increases (black trace).

In FIG. 5B, as force exerted on the tetrapod increases, its fluorescence spectra shifts to longer wavelengths (brown trace) is spectra low force and blue trace is spectra at high force. Dark state is also illustrated.

As the AFM tip applies a force on the tetrapod by pressing it, tetrapod fluorescence emission intensity increases (simultaneous with increasing force) the fluorescence emission shifts to longer wavelengths. This is an important finding since CdS/CdSe tetrapods can serve as a single molecule optical strain gauge.

Single molecule fluorescence and single molecule force measurements with AFM are two powerful techniques, however, each suffers from limitations overcome by system 10. Validation of the approach has also been accomplished with the following examples, including we can "cut" a single" molecule from a single surface and paste it on a target, or we can record the fluorescence emission spectra of a single molecule while pressing it with an AFM tip.

The set up for these examples is shown in FIGS. 1A-1F. Tip localization is illustrated in FIGS. 2A-2G. The AFM is located over the focused excitation laser beam 30 by recording Raleigh scattered light as the AFM tip is scanned over the laser beam. FIG. 2A is scanning electron microscope image of an AFM tip. FIG. 2B is an image of Raleigh scattered light by the tip.

To confirm that the apex for the AFM tip corresponds to the maxima in its Raleigh scattered image, we used the tip to move a 20 nm fluorescence bead located over the excitation FM laser. Fluorescence from the bead (FIG. 2C) and light scattered by the tip (FIG. 2D) were recorded simultaneously. The AFM tip was scanned over the FM laser beam, as the tip displaced the bead, an abrupt decrease in fluorescence was observed. Scale bar in FIGS. 2C and 2D is 100 nm.

As can be appreciated by those skilled in the art, the foregoing example illustrates benefits and capabilities of system 10. Other beneficial applications are, of course, possible. Several others are discussed in this description. These examples are neither inclusive nor exclusive of possible uses of system 10.

4.4 Method of Tip Localization and Tip/Sample Alignment

As mentioned earlier, a critical technological hurdle to AFM/FM integration is difficulty in aligning the AFM tip to single molecules or similar nanoscale objects. One aspect of the present invention includes a beneficial methodology of doing so that can be applied in a variety of AFM/FM applications.

Reference should also be taken to FIGS. 2A-G which also illustrate tip localization. The AFM tip is located over the focused excitation FM laser beam 30 by recording Raleigh scattered light as the AFM tip is scanned over the FM laser beam. A scanning electron microscope image of a typical AFM tip is shown at FIG. 2A and its Raleigh scattered image is shown at FIG. 2B. To confirm that the apex of the AFM tip corresponds to the maxima in its Raleigh scattered image, we use the tip to move a 20 nm fluorescence bead located over the excitation FM laser. Fluorescence from the beam (FIG. 2C) and light scatted by the tip (FIG. 2D) were recorded simultaneously. The AFM tip was scanned over the FM laser beam; as the tip displaced the FM beam, an abrupt decrease in fluorescence was observed. Scale bar: 100 nm.

4.4.1 Positioning AFM Tip Over a Single Molecule

A critical obstacle in using a sharp AFM probe for combined single molecule AFM-FM measurements is the low probability of interaction between fluorescent molecules on the substrate and the sharp AFM tip. Commercially available AFM tips have a radius of curvature of approximately 10 nm. Similarly a single molecule has a size of approximately 1 nm to 10 nm. When the tip and molecule are visualized, their corresponding image has a size R, that is limited by the wavelength of light: $R=\lambda/(2\times NA)$ where NA is the numerical aperture of the optical system. With an AFM-FM instrument, images of the tip and molecule have a size of several hundred nanometers. Since the dimensions of both the fluorescent molecules and the radius of curvature of a sharp AFM tip are significantly smaller than these images, the tip cannot be positioned exactly over the fluorescent molecule using diffraction limited optics. This hurdle can be overcome by accurately positioning the AFM tip over a fluorescent molecule.

This exemplary embodiment allows the immobilized fluorescent molecule and the AFM tip to be precisely aligned in registry at the center of the confocal microscope laser beam—the FM laser beam. The FM laser beam has a known, fixed location in space, and a known width and other characteristics. It can be similar or the same to a typical excitation laser used in FM. The FM laser is thus used both for FM (fluorescence microscopy) functions and information about a sample (e.g. a molecule or other), but also for estimating and knowing the AFM tip location so it can be more accurately positioned relative a sample. This dual function of the FM laser helps integrate and promote improved performance of the AFM and FM subsystems. To locate the AFM tip over a fluorescent molecule we use the following steps (see also the flow chart and illustrations at FIG. 2H):

1. We image the AFM tip (e.g. distal end of cantilever 19—see FIG. 2A) and the confocal microscope laser beam (the FM beam 30) using the microscope eyepiece as well as a CCD camera (can be camera 24). We then use a manual micrometer stage to coarsely align the AFM tip over the FM laser beam.
2. We use a closed loop piezoelectric stage (henceforth referred to as piezo-1; can be the stage for sample surface 52 in FIG. 1C) to position the AFM tip approximately 500 nm above the sample surface and again use the manual micrometer stage to move AFM tip to the FM laser beam.
3. We then scan the AFM tip over the FM laser beam using piezo-1 and use an avalanche photo diode (APD) (e.g. one or more APDs 20) to measure the light reflected off the AFM tip. The reflected light is measured at each position of the AFM tip (e.g. positions can be spaced 1 nm to 100 nm apart) to obtain its image using a home-built LabView program. A screen shot of the program is shown in FIG. 2E. The AFM tip looks like a round circle in the image (see also FIG. 2H, picture to the right of step (a)). The center of the tip is located by calculating the centroid of the optical intensity and moving tip to this position with nm precision using piezo-1.
4. With the AFM tip still positioned approximately 500 nm away from surface, the sample is scanned over the FM laser beam using a second piezoelectric stage (henceforth referred to as piezo-2) to obtain a fluorescence image of the molecules using our home-built LabView program. FIG. 2F shows a screen shot of the program showing individual molecules. Each individual molecule is either identified manually using the computer mouse or detected automatically. Coordinates of the molecule are recorded.
5. Finally, the individual molecules are brought within the FM laser beam one at a time using piezo-2. The molecules are scanned over the FM laser beam using piezo-2 (1 um×1 um scan size) record their image. This image is fitted to a 2D Gaussian function and the location of its peak is calculated. Depending on number of photons collected, the peak position can be located with nanometer accuracy.
6. Using piezo-1, the AFM tip is then used to press or stretch the molecule while recording corresponding changes in fluorescence. A trigger signal indicating start of AFM tip movement is sent to APD (avalanche photo diodes) to synchronize the recording of fluorescence time traces. A screen shot of the home-built LabView program to do this is shown in FIG. 2G.

We repeat these steps with every fluorescent molecule. See FIG. 2H for a further illustration. An advantageous application of this tip positioning method in smAFM-FM is disclosed at Hui Li, Chi-Fu Yen, and Sanjeevi Sivasankar, *Fluorescence Axial Localization with Nanometer Accuracy and Precision*, Nano Lett. 2012, 12, 3731-3735, and the "Supporting Information" cited therein, which available via the Internet at http://pubs.acs.org, all of which is incorporated by reference herein. This article includes description of this AFM tip positioning technique, including centroid determination; referred to as FIONA. See also, Yildiz, et al., SCIENCE 2003, 300, 2061-2065, incorporated by reference herein, regarding the FIONA centroid determination steps that can be used with the foregoing AFM tip and sample locating technique.

4.4.2 Steps for Obtaining Photoluminescence Spectra of Single Molecules

Figure 3B:
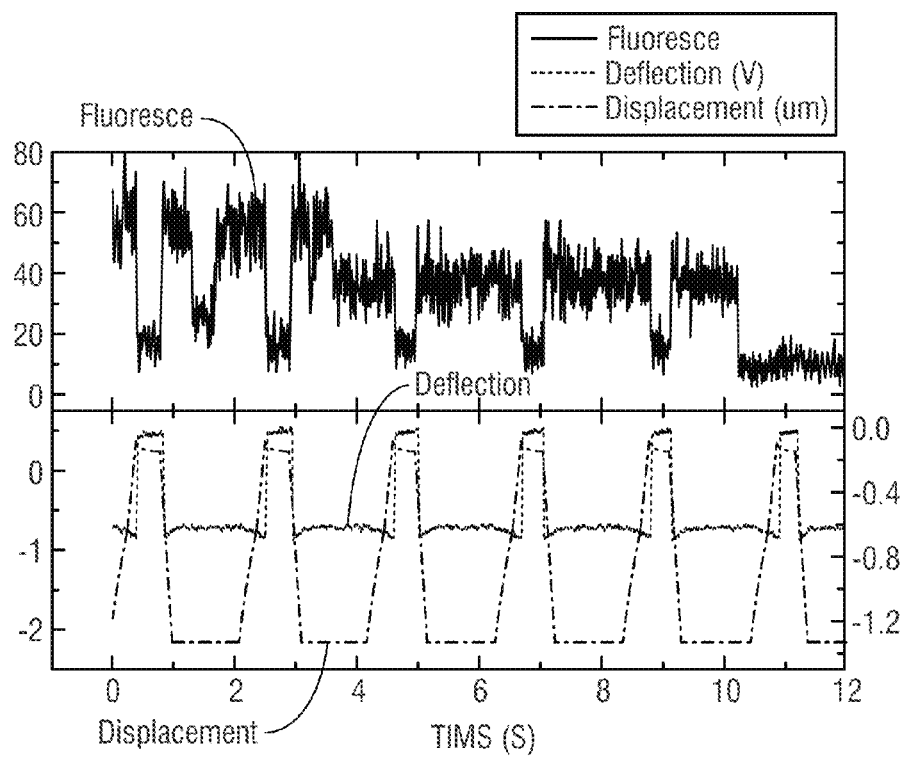
Figure 3C:
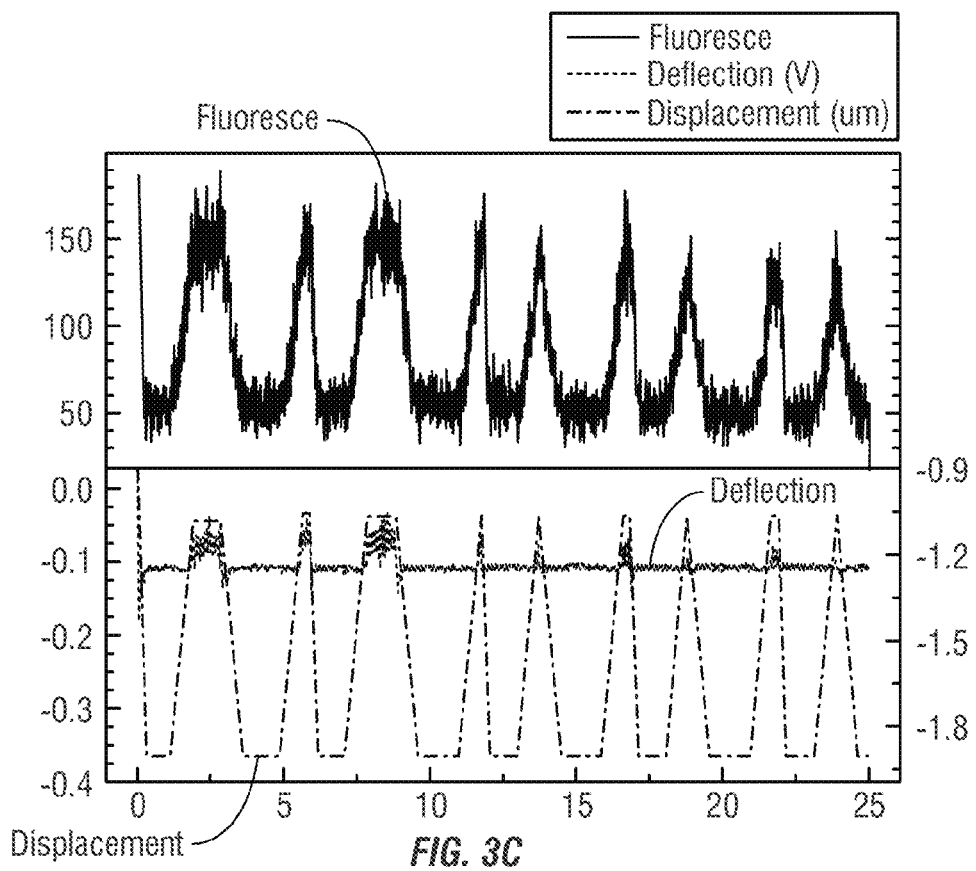
Figure 3D:
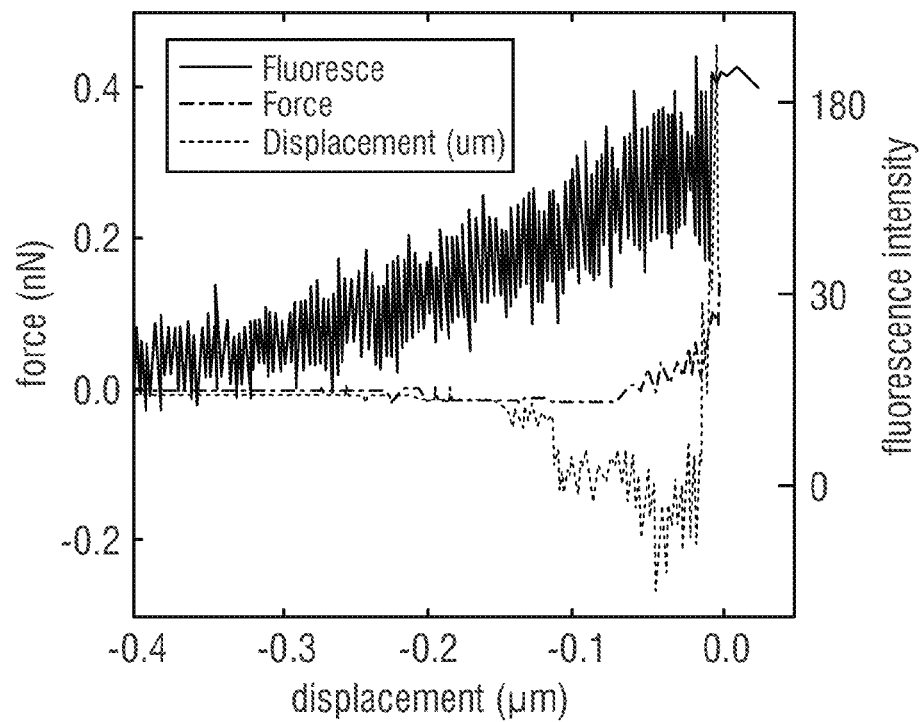

Our microscope also can incorporate a spectrometer and an Electron Multiplied CCD (EMCCD) camera to record the force dependent changes in fluorescence spectra of individual molecules. We accomplish this by following the six steps listed above to locate the AFM tip and single molecule at the center of the laser beam. In the sixth step, we also send the trigger signal indicating start of AFM tip movement to the EMCCD camera to synchronize fluorescence spectra acquisition. The AFM tip is then used to press or stretch the molecule while recording corresponding changes in fluorescence spectra. See, e.g., FIGS. 3A and 3B.

See also Choi, C., Li, H., Olson, A., Jain, P, Sivasankar, S., Alivisatos, A., NANO LETT. 2011, 11, 2358-2362, incorporated by reference herein.

4.5 Example Applications
4.5.1 Overview

As can be appreciated by those skilled in the art, the apparatus and methods discussed above can be applied in a variety of ways. Some have been mentioned.

The Figures and Examples 1-3 below, provide a compilation of some of those applications. See also, Li, H., Yen, C., Sivasankar, S., "*Simultaneous single molecular fluorescence with AFM* force spectroscopy", Abstract: S1.00140 (Bulletin of the American Physical Society, APS March Meeting 2011, Volume 56, No. 1 (and poster), incorporated by reference herein. Below is some additional discussion of either those examples or others.

Example 1

Microscope for Simultaneous Single Molecule AFM and Fluorescence Measurements

Description of Microscope

We disclose the invention of an integrated single molecule Atomic Force Microscope-Fluorescence Microscope (smAFM-FM) for biomedical research, drug discovery, disease diagnosis, ultra-sensitive bio-sensing, nanotechnology and materials science applications. Single molecule force measurements with the Atomic Force Microscope (AFM) and single molecule fluorescence techniques like Fluorescence Imaging, Fluorescence Spectroscopy and Fluorescence Resonance Energy Transfer (FRET) are widely used to study single molecules and nanoscale structures. Single molecule fluorescence can report on the structure and dynamics of molecules while AFM can be used to load and manipulate molecules and measure their interactions. However each of these techniques suffers from limitations that can be overcome using a combined smAFM-FM approach. For example, with a stand-alone AFM it is difficult to determine the structural changes in molecules as they interact. These can however be identified by attaching fluorescent probes to the molecules and monitoring their structure and dynamics using FRET. Similarly using smAFM-FM it is possible to apply forces on materials and monitor changes in their optical properties, an approach which is critical for the design of nanoscale optical force sensors.

Here we describe a smAFM-FM instrument using which we can apply forces on individual molecules or nanoscale objects and simultaneously monitor their structure, dynamics and optical properties. This microscope can be used for combined single molecule measurements such as (i) AFM-FRET intensity and lifetime measurements, (ii) AFM-fluorescence intensity and spectral measurements, (iii) AFM-photon antibunching experiments, and (iv) AFM-Raman measurements.

A schematic of our instrument is shown in FIG. 1C. A tip scanning AFM modified with a 970 nm infrared Super Luminescent Diode (SLD) is mounted on a homebuilt sample scanning confocal microscope. A 532 nm frequency doubled Nd:YAG laser, a 650 nm diode laser, and a 488 nm solid state laser, are coupled to a single mode optical fiber, circularly polarized and telescoped to overfill the back aperture of a 60x, 1.42 NA oil immersion objective. Fluorescence is collected by the objective, spectrally separated and detected either by two single photon counting avalanche photodiodes (APD) or dispersed by a high resolution grating onto a back-thinned EMCCD camera. The AFM is mounted on the optical microscope using a homebuilt low-noise stage. We have also developed an intuitive graphical user interface to control all the optomechanical and electronic components of the microscope in a synchronized fashion and to display data in real time. The smAFM-FM microscope can measure the force dependent optical properties in a variety of environmental conditions including air and aqueous solutions/biological buffers. The former condition is important for studying nanoscale materials and polymers while the latter is important for studying biological molecules and living cells.

For simultaneous single molecule AFM-FRET measurements, macromolecules labeled with donor fluorophores and their binding partners labeled with acceptor dyes are immobilized on the substrate and AFM-tip respectively and allowed to interact. The tip and substrate are separated to rupture the molecular complex and measure its bond strength with pN resolution. Simultaneously, donor and acceptor fluorescence are collected by the objective, spectrally separated and detected by the two APDs to determine FRET in real time. The FRET time traces indicate changes in the structure of the bound molecules with nm resolution and the dynamics of unbinding with ms time resolution.

For simultaneous single molecule AFM-Fluorescence spectral measurements, fluorescent nanoparticles (like semiconductor nanocrystals) or biomolecules labeled with fluorophores are immobilized on a substrate. A calibrated force is exerted on the molecules using the AFM tip while simultaneously the fluorescence is collected by the objective and dispersed by a high resolution grating onto a back-thinned EMCCD camera.

FIGS. 5A and 5B. Using smAFM-FM to measure force dependent of optical properties of CdS/CdSe tetrapod, a technologically important semiconductor nanocrystal. FIG. 5A. When the AFM tip exerts force on a tetrapod by pressing it (red trace), tetrapod fluorescence emission intensity increases (black trace). FIG. 5B. As the force exerted on the tetrapod increases, its fluorescence spectra shifts to longer wavelengths (brown trace is spectra at low force and blue trace is spectra at high force).

As a proof of principle, we used smAFM-FM to measure the force dependent of optical properties of CdS/CdSe tetrapod, a technologically important semiconductor nanocrystal. We were able to demonstrate, for the first time in the world, that a single tetrapod changes its optical properties when subjected to an external force (FIGS. 5A and 5B). As the AFM tip applies a force on the tetrapod by pressing it (FIG. 5A, red trace), the tetrapod fluorescence emission intensity increases (FIG. 5A black trace). Simultaneously with increasing force, the fluorescence emission shifts to longer wavelengths (FIG. 5B). This is an important finding since CdS/CdS tetrapods can serve as a single molecule optical strain gauge.

Potential Applications

1. Life science research: Determining the structure and dynamics of biological molecules such as DNA and proteins. These measurements can be conducted both in vitro as well as in living cells. Determining the interaction of biomolecules with receptors and toxins.

2. Drug discovery: Direct observation of targeted drug delivery and drug binding to target molecules in vitro, in live cells and tissue. This will enable rational design of better pharmaceutical products 3. Nanoscience and nanotechnology: Characterization of the optical properties of nanoscale materials like semiconductor nanocrystals, nanotubes and nanowires. Measuring the force dependent optical properties of these materials will enable development of new technologies like optical force sensors, touch screen displays, and nanoscale biomedical diagnostic devices.

4. Material science: Characterization of materials with novel force dependent optical properties. Developing more efficient organic semiconducting polymers by determining the relationship between the optical and electronic properties and polymer structure.

5. Environment research: Detection of toxins and pollutants at the ultimate (single molecule) resolution. Identifying chemical properties of the toxin at the single molecule level using its spectral signature.

6. Optical MEMS industry: Design of Optical MEMS devices that rely on external stress to change optical properties, for example pressure sensors, disk-drive heads, biosensors, and optical switches.

Example 2

Technical Objectives

Background:

The focus of this project is to develop an integrated single molecule Atomic Force Microscope-Fluorescence Microscope (smAFM-FM) for biomedical research, drug discovery, disease diagnosis, and ultra-sensitive bio-sensing applications. Single molecule fluorescence, particularly Fluorescence Resonance Energy Transfer (FRET), and single molecule force measurements with the Atomic Force Microscope (AFM) are two powerful techniques that are widely used to study single molecules and their interaction with receptors, toxins, and pharmaceuticals. Single molecule FRET can report on the structure and dynamics of biomolecules while AFM can be used to manipulate molecules and measure their interactions. However each of these techniques suffers from limitations that can be overcome using a combined smAFM-FM approach. For example, with a standalone AFM it is difficult to determine the structural changes in biological molecules as they interact. These can however be identified by attaching fluorescent probes to the molecules and monitoring their structure and dynamics using FRET.

The smAFM-FM instrument applies forces on individual biological molecules and simultaneously monitor their structure and dynamics. This microscope has increased capabilities, efficiency, bandwidth, and ease of use.

A schematic of our smAFM-FM system is shown in FIG. 1C. A tip scanning AFM is mounted on a sample scanning confocal microscope. Macromolecules (for e.g. biological receptors) labeled with a donor fluorophore are bound to a substrate while their binding partners (i.e. ligand) labeled with acceptor dyes are immobilized on an AFM-tip. The substrate is raster scanned to image individual donor labeled receptors and locate them under the AFM tip. The tip and substrate are bought into contact so that receptor and ligand bind; and then withdrawn to rupture the receptor-ligand complex and measure its bond strength with 1 pN resolution. Simultaneously, donor and acceptor fluorescence is measured with single photon counting avalanche photodiodes to determine FRET in real time. The FRET time traces indicate changes in the structure of the bound biomolecules with 1 nm resolution and the dynamics of unbinding with 1 ms time resolution.

Proposed Proof of Principle Experiment:

To validate the smAFM-FM technique, we will measure the force induced shearing of dye-labeled, double stranded DNA. The DNA will be sheared into its complementary single strands and mechanical transitions corresponding to DNA rupture will be correlated with changes in FRET. This experiment will showcase smAFM-FM's capabilities to simultaneously measure the interaction of single biomolecules with pN force resolution, their structure with nm distance resolution, and dynamics with ms time resolution.

Instrument Design:

The instrument will have a similar optical scheme as FIG. 1C. The instrument can be, for example, integrated with a commercially-available AFM platform (e.g. Novascan's VErtigo AFM platform) and will be more user friendly with a smaller footprint. A pulsed laser will be used to measure single molecule fluorescence and FRET lifetimes and perform anti bunching measurements. Additionally, the fluorescence will be dispersed using a grating onto a CCD camera to obtain single molecule fluorescence spectra. This optical setup will enable multiple plug-and-play single molecule modules to be incorporated into the instrument including (i) AFM-FRET intensity and lifetime measurements, (ii) AFM-fluorescence intensity and spectral measurements, (iii) AFM-photon antibunching experiments, (iv) AFM-Raman measurements, (v) Near Field Scanning Optical microscopy (NSOM) and (vi) stand-alone AFM, Fluorescence, FRET and Raman spectroscopy.

Examples of the components of FIG. 1C are: Back-illuminated ultra-low-noise EMCCD camera; High-Speed closed loop piezo stage and controller, Inverted microscope, Two Silicon Avalanche Photodiode based Single Photon Counting Modules, Two electronic fast shutters and controllers, Green (532 nm) laser, Red (650 nm) laser, Optical Table, Relay Optics and Optomechanics, Various excitation and emission fluorescence filters, Oil immersion 60× (1.4 NA) objective lens, Ratemeter, Spectrum analyzer, Digital Optical Power Meter, Spectrum analyzer, Miscellaneous electronics, Atomic Force Microscope.

Example 3

Technical Objectives

Background

Single Molecule Fluorescence Resonance Energy Transfer (FRET) and single molecule force measurements with the Atomic Force Microscope (AFM) are two powerful techniques that have facilitated much progress in the biological sciences. Single molecule FRET measures energy transfer between fluorescent dyes tagged to biomolecules; and can report on the conformational state and the dynamics of the biomolecules. AFM can measure the interaction between molecules immobilized on a cantilever and surface and can also be used to mechanically manipulate molecules. However each of these techniques suffers from limitations that can be overcome by the use of a combined single molecule AFM-FRET approach. For example, with a stand-alone AFM it is difficult to determine precisely where force exerts its effect within a macromolecular complex. This location can however be identified by attaching fluorescent probes to molecular sub-domains and monitoring their motion using single molecule FRET. The instrument combines a single molecule Atomic Force Microscope (AFM) with Fluorescence Resonance Energy Transfer (FRET) to apply forces on individual biological molecules and simultaneously monitor their conformational dynamics. The components A Highly Integrated, Modular, Turn-Key Instrument The instrument will be highly integrated and contain multiple interchangeable "plug-and-play" modules that can be used for a variety of bulk and single-molecules measurements such as (i) Simultaneous AFM-FRET intensity measurements, (ii) Simultaneous AFM-FRET lifetime measurements, (iii) Simultaneous AFM-fluorescence intensity and spectral measurements, (iv) Simultaneous AFM-photon antibunching experiments, (v) Simultaneous AFM-Raman measurements, (vi) Aperture-less Near Field Scanning Optical microscopy (NSOM) and (vii) stand-alone AFM, Fluorescence, FRET and Raman spectroscopy.

The microscope setup is shown schematically in FIG. 1C. In the instrument, a tip scanning AFM will be mounted on a sample scanning confocal microscope. Macromolecules (for e.g. biological receptors) labeled with a donor fluorophore will be bound to a substrate while their binding partners (i.e. ligand) labeled with acceptor dyes will be immobilized on an AFM-tip. The substrate will be raster scanned to image individual donor labeled receptors and locate them under the AFM tip. The tip and substrate will be bought into contact so that receptor and ligand bind; and then withdrawn to rupture the receptor-ligand complex and measure its bond strength with 1 pN resolution. Simultaneously, donor and acceptor fluorescence will be measured with single photon counting avalanche photodiodes to determine FRET in real time. The FRET time traces will indicate changes in the structure of the bound biomolecules with 1 nm resolution and the dynamics of unbinding with 1 ms time resolution. Alternatively, a pulsed laser system will be used to detect fluorescence and FRET lifetimes. This laser will also be used for fluorescence antibunching measurements to detect the number of independent emitters in conjugated molecules as the conformation of the biomolecule is altered with the AFM. In addition, the instrument can be used to measure the force dependent optical properties of semiconductor nanocrystals and conjugated molecules such as organic semiconductors and photosynthetic proteins. For these experiments the fluorescence will be dispersed using a grating onto a CCD camera to obtain single molecule fluorescence spectra.

This technology satisfies critical academic and industrial needs to decipher fundamental biological processes, such as molecular recognition, drug discovery, and structure-function relationships in biomolecules. The instrument can also be used to determine the conformation dependent optical properties of organic semiconductors used in light emitting devices; where molecular structure plays an important role in device function.

4.5.2 Single Molecule Cut and Single Molecule Paste

With reference to FIG. 4 (and Examples 1-3 above), the concept of using AFM/FM to cut and paste single molecules is illustrated.

FIG. 4 illustrates a biotin functionalized AFM tip was used to cut and paste a single fluorescent streptavidin molecule. Attempts were made in a 400 nm×400 nm 2D array to cut a single molecule located within a diffraction-limited laser beam. When the streptavidin was cut, an abrupt loss of fluorescence signal was measured. The fluorescence reappeared when the streptavidin was re-pasted on the surface.

4.5.3 Photoluminescence Spectra of Single Molecule

With reference to FIGS. 5A and B (and Example 1 above), the concept of using AFM/FM to measure force dependent optical properties of a nanoscale structure are illustrated. We measured force-dependent changes in optical properties of a Cds/CdSe tetrapod. See also Example 1 (which discusses details about such tetrapods and other concepts regarding use of the system 10).

FIG. 5A. Using smAFM-FM to measure force dependent of optical properties of CdS/CdSe tetrapod, a technologically important semiconductor nanocrystal. When the AFM tip exerts force on a tetrapod by pressing it (red trace), tetrapod fluorescence emission intensity increases (black trace).

FIG. 5B. As the force exerted on the tetrapod increases, its fluorescence spectra shifts to longer wavelengths (brown trace is spectra at low force and blue trace is spectra at high force).

4.5.4 Force Dependent Evaluation on Biological Molecules

By referring to FIGS. 3A-D, as well as Example 1 above, note the following: 30 bp dsDNA with TAMRA (donor) and Cy5 (acceptor) is functionalized with a biotin and dithiol group to allow binding to surface and AFM tip.

Single molecule Fluorescence Resonance Energy Transfer (FRET) and single molecule force measurements with AFM have facilitated much progress in the biological sciences. However each of these techniques suffers from limitations that can be overcome by the use of a combined single molecule AFM-FRET approach. Here the AFM-FM instrument (e.g. system 10) combines single molecule AFM with FRET to apply forces on individual biological molecules and simultaneously monitor their conformational dynamics. To validate this technique, we will measure the force induced shearing of dye-labeled, double stranded DNA. Single DNA molecules will be sheared and mechanical transitions corresponding to DNA rupture correlated with changes in FRET.

AFM can measure the interaction between molecules immobilized on a cantilever and surface and can also be used to mechanically manipulate molecules. With stand-alone AFM it is difficult to determine precisely where force exerts its effect within a macromolecular complex. This location can however be identified by attaching fluorescent probes to molecular sub-domains and monitoring their motion using single molecule FRET. See, e.g., *NANO LETT,* 2009, Vol. 9, No. 5, 2120-2124. The present system 10 and alignment methods can improve on these tasks. Bond strength can be measured, e.g., with 1 pN resolution. For further information refer to attached Examples 1-3 above.

Using a set up similar to FIG. 1C, tip scanning AFM will be mounted on a sample scanning confocal microscope. Macromolecules (e.g., biological receptors) labeled with a donor fluorophore will be bound to a substrate while their binding partners (i.e., ligand) labeled with exceptor dyes will be immobilized on an AFM-tip. The substrate will be raster scanned to image individual donor labeled receptors and locate them under the AFM tip. The tip in some substrate will be brought into context so that receptor and ligand bind, and then withdrawn to rupture the receptor-ligand complex and measure its bond strength with one pN resolution. Simultaneously, donor and exceptor of fluorescence will be measured with single photon counting avalanche photodiodes to determine FRET in real time. The FRET time traces will indicate some changes in the structure of the bound biomolecules with 1 nm resolution in the dynamics of them binding with one ms time resolution.

Alternatively, a pulsed laser system will be used to detect fluorescence in FRET lifetimes. This laser will also be used for fluorescence antibunching measurements to detect a number of independent emitters in conjugated molecules as the conformation of the biomolecule is altered with the AFM. In addition, the instrument can be used to measure the force dependent optical properties of semiconductor nanocrystals and conjugated molecules, such as organic semiconductors and photosynthetic proteins. For these experiments, the fluorescence will be dispersed using a grating on to a CCD camera to obtain single molecule fluorescence spectra. Applications include academic and industrial needs to decipher fundamental biological processes such a molecular recognition, drug discovery, and structure-function relations in biomolecules.

The instrument can also be used to determine the conformation dependent optical properties of organic semiconductors and used in light emitting devices, where molecular structure plays an important role in device function.

It can therefore be appreciated that system 10 and its methods are a combined single molecule AFM-confocal fluorescence microscope capable of simultaneously measuring fluorescence time traces, spectrum, and forces of single molecules.

4.6 Other Applications

Additional applications include but are not limited to:
a. Life science research: Determining the structure and dynamics of biological molecules such as DNA and proteins. Determining the interaction of biomolecules with receptors and toxins.
b. Drug discovery: Direct observation of targeted drug delivery and drugs interactions in vitro, in live cells and tissue. This will enable rational design of better pharmaceutical products.
c. Nanoscience and nanotechnology: Characterization of the optical properties of nanoscale materials like semiconductor nanocrystals, nanotubes and nanowires. Measuring the force dependent optical properties of these materials will enable development of new technologies like optical force sensors, touch screen displays, and nanoscale biomedical diagnostic devices.
d. Material science; Characterization of material with novel force dependent optical properties. Developing more efficient organic semiconductor polymers by determining the relationship between the optical and electronic properties and polymer structure.
e. Environment research: Detection of toxins and pollutant at the ultimate (single molecule) resolution. Identifying chemical properties of the toxin at the single molecule level using its spectral signature.
f. Optical MEMS industry: Design of Optical MEMS devices that rely on external stress to change optical properties, for example, pressure sensors, disk-drive head, biosensors, and optical switches.

4.7 Alternatives & Options

As will be appreciated by those skilled in the art, the invention can take many forms and embodiments. Variations obvious to those skilled in the art will be included within the invention, which is not limited by the specific exemplary embodiments presented herein.

For example, the specific commercial components utilized to form system 50 can vary according to need or desire. Additionally, the specific samples under investigation can vary.

Specific additional options or alternative follows.

4.7.1 Highly Integrated, Modular, Turn-Key Instrument System 10 is highly integrated and can optionally contain multiple interchangeable "plug-and-play" modules and can be used for a variety and single-molecules measurements such as (a) simultaneous AFM-FRET intensity measurements, (b) simultaneous AFM-FRET lifetime measurements, (c) simultaneous AFM-fluorescence intensity and spectromeasurements, (d) simultaneous AFM-photo antibunching experiments, (e) simultaneous AFM-raman measurements, (f) aperture-less near field scanning optical microscopy (NSOM), and (g) stand-alone AFM, fluorescence, FRET and raman spectroscopy.

Similar to other commercial analogs (e.g. other systems with interchangeable "plug and play" modules), as can be appreciated by those skilled in the art, different modules for different AFM/FM applications can be configured and made available to end-users.

Regarding the modules, preassembled small plug in modules for different ones of these functions can be prepared. The operator can simply change as needed.

4.7.2 Different Components

Examples of generic components for system 10 can include the following. As is appreciated by those of skill in the art, obvious variations are possible.

Examples of equipment and components that can be used in one set up include but are not limited the following:
a. back illuminated ultra-low noise EMCCD camera
b. high-speed closed loop Piezo stage and controller
c. inverted microscope
d. two silicon avalanche photodiode-based single photon counting modules
e. single channel FFET spectrum analyzer
f. one xyz translation stages
g. xy or xyz piezoelectric stage
h. stereo microscope
i. muffler furnace
j. notch-filter
k. two Newport electronic fast shutter (two ms) and controller
l. various excitation and emission fluorescence filters
m. oil emersion 100×1.4 NA objective lens
n. rate meter
o. digital optical power meter
p. 20 mW laser
q. Red (633 nm) 25 mW laser
r. Optical table
s. Relay optics and optomechanics
t. Atomic force microscope (with its laser and quadrant photodiodes)
u. Data acquisition devices
v. AFM tips and reagents.

Variations obvious to those skilled in the art are, of course, possible.

What is claimed is:

1. An integrated system for simultaneous AFM and fluorescence measurements and interrogation of a sample, including a single molecule, comprising:
    a. a piezoelectric stage having a sample interrogation location;
    b. an AFM scanner with AFM probe and an AFM laser aimed at the AFM probe;
    c. at least one of the stage and/or the scanner with at least one degree of freedom of movement adjustability;
    d. a confocal objective lens having an optical path between and extending from a sample side and an opposite side, the optical path alignable with the sample interrogation location on the stage;
    e. an FM laser excitation source configured for optical communication with the optical path on the opposite side of and then through the objective lens to the sample interrogation location on the stage;
    f. an FM detector configured for optical communication with the optical path on the opposite side of the lens to simultaneously receive:
        i. reflections of the FM laser from the AFM probe to record movement and location of the AFM probe; and
        ii. fluorescence from a sample excited by the FM laser excitation source to record FM information.

2. The system of claim 1 further comprising one or more additional FM lasers that can be directed along the same optical path as said FM laser.

3. The system of claim 1 further comprising a main housing or platform which receives one or more of the AFM scanner and probe, AFM laser, FM laser excitation source, AFM detector, and FM detector in modular form, each modulo including an interface that allows interchangeable modules for different functions.

4. The system of claim 1 further comprising a processor integrated physically and operationally to one or more of the AFM scanner and probe, AFM laser, FM laser excitation source, AFM detector, and FM detector, and one or more optical components.

5. The system of claim 1 wherein the FM excitation laser is correlated in wavelength to exciting fluorescence a sample to be interrogated and is directed along an optical path that is merged with the optical path through the objective lens.

6. The system of claim 5 wherein at east a portion of the optical path of the excitation laser comprises a fiber optic.

7. The system of claim 1 further comprising a processor with an AFM probe locating algorithm which estimates AFM probe location by scanning the probe through a fixed position laser beam, finding the centroid of reflected intensity, and recording centroid position relative to the FM laser beam.

8. The system of claim 1 further comprising a processor with a sample locating algorithm which estimates sample location by scanning the sample through a fixed position laser beam, finding the centroid of fluorescence, and recording centroid position relative to the FM laser beam.

9. The system of claim 1 wherein the FM detector comprises one or more avalanche photodiodes.

10. The system of claim 1 wherein the FM detector comprises a diffraction grating and imager.

\* \* \* \* \*

UNITED STATES PATENT AND TRADEMARK OFFICE
CERTIFICATE OF CORRECTION

| | | |
|---|---|---|
| PATENT NO. | : 8,656,510 B1 | Page 1 of 1 |
| APPLICATION NO. | : 13/569927 | |
| DATED | : February 18, 2014 | |
| INVENTOR(S) | : Sivasankar et al. | |

It is certified that error appears in the above-identified patent and that said Letters Patent is hereby corrected as shown below:

In the Claims:

Col. 21, Claim 3, Line 1:
DELETE after each "modulo"
ADD after each --module--

Col. 21, Claim 5, Line 10:
ADD after fluorescence --in--

Col. 21, Claim 6, Line 13:
DELETE after a "east"
ADD after at --least--

Signed and Sealed this
Twenty-seventh Day of May, 2014

Michelle K. Lee
*Deputy Director of the United States Patent and Trademark Office*